United States Patent
Line et al.

(10) Patent No.: US 11,318,871 B2
(45) Date of Patent: May 3, 2022

(54) MOVABLE ARMREST ASSEMBLY FOR A VEHICLE

(71) Applicant: Ford Global Technologies, LLC, Dearborn, MI (US)

(72) Inventors: Johnathan Andrew Line, Northville, MI (US); Jimmy Moua, Canton, MI (US); Deeptej Kudav, Southgate, MI (US); Benjamin Yilma, Canton, MI (US); Keith Allen Godin, Dearborn, MI (US); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/012,577

(22) Filed: Sep. 4, 2020

(65) Prior Publication Data
US 2022/0072983 A1   Mar. 10, 2022

(51) Int. Cl.
*B60N 2/75* (2018.01)
*B60N 2/68* (2006.01)

(52) U.S. Cl.
CPC .............. *B60N 2/777* (2018.02); *B60N 2/682* (2013.01); *B60N 2/763* (2018.02)

(58) Field of Classification Search
CPC ................................. B60N 2/777; B60N 2/763
See application file for complete search history.

(56) References Cited

U.S. PATENT DOCUMENTS

| | | | | |
|---|---|---|---|---|
| 3,926,473 A | * | 12/1975 | Hogan | B60N 2/793 297/115 |
| 4,768,832 A | * | 9/1988 | Wain | B64D 11/0693 297/115 |
| 4,917,438 A | * | 4/1990 | Morgan | A47C 1/023 297/116 |
| 5,951,084 A | | 9/1999 | Okazaki | |
| 6,017,091 A | * | 1/2000 | Cao | A47C 1/03 297/411.37 |

(Continued)

FOREIGN PATENT DOCUMENTS

| | | |
|---|---|---|
| DE | 102008027578 A1 | 1/2009 |
| DE | 102007041319 A1 | 3/2009 |
| JP | 2007191040 A | 8/2007 |

*Primary Examiner* — David R Dunn
*Assistant Examiner* — Tania Abraham
(74) *Attorney, Agent, or Firm* — Vichit Chea; Price Heneveld LLP

(57) ABSTRACT

A seating assembly of a row of seating of a vehicle comprising: (a) a seat including a frame having an inboard side; and (b) an inboard armrest assembly comprising: (i) a lower bracket attached to the inboard side of the frame of the seat; (ii) an upper bracket pivotally coupled to the lower bracket about a pivot axis extending generally forward-to-rearward; and (iii) a cushion unit mounted upon the upper bracket, the upper bracket having an inboard position and, upon application of an outboard force to the upper bracket, an outboard position further outboard than the inboard position, the upper bracket transitioning from the inboard position to the outboard position about the pivot axis. The outboard force moving the cushion unit to the outboard position removes the inboard armrest assembly from projecting into a center aisle of a vehicle.

20 Claims, 24 Drawing Sheets

(56) References Cited

U.S. PATENT DOCUMENTS

| | | | | |
|---|---|---|---|---|
| 6,793,282 B2* | 9/2004 | Plant | ............. | B60N 3/002 |
| | | | | 297/248 |
| 7,066,546 B2* | 6/2006 | Trego | ............. | A47C 1/0307 |
| | | | | 297/411.37 |
| 7,188,907 B1* | 3/2007 | Lai | ............. | A47C 1/03 |
| | | | | 297/411.35 |
| 7,934,771 B2* | 5/2011 | Tamakoshi | ............. | B60N 2/753 |
| | | | | 297/216.1 |
| 8,016,360 B2* | 9/2011 | Machael | ............. | A47C 1/0308 |
| | | | | 297/411.37 |
| 8,496,290 B2* | 7/2013 | Maier | ............. | B60N 2/3009 |
| | | | | 297/112 |
| 9,340,129 B2* | 5/2016 | Roychoudhury | ............. | B60N 2/4235 |
| 10,279,717 B2* | 5/2019 | Ketels | ............. | B60N 3/002 |
| 2009/0184559 A1* | 7/2009 | Nakaya | ............. | B60N 2/753 |
| | | | | 297/411.32 |

* cited by examiner

MOVABLE ARMREST ASSEMBLY FOR A VEHICLE

FIELD OF THE DISCLOSURE

The present invention generally relates to a movable armrest assembly of a vehicle.

BACKGROUND OF THE DISCLOSURE

Some vehicles include a second row of seating with a center aisle and a third row of seating behind the second row of seating.

SUMMARY OF THE DISCLOSURE

The disclosure addresses that challenge in two ways. First, the disclosure addresses that challenge with a seating assembly of a row of seating comprising (a) a seat including a frame having an inboard side, and (b) an inboard armrest assembly including (i) a lower bracket attached to the inboard side of the frame of the seat, (ii) an upper bracket pivotally attached to the lower bracket about a pivot axis extending generally forward-to-rearward, and (iii) a cushion mounted upon the upper bracket, the upper bracket having an inboard position and, upon application of an outboard force to the upper bracket, an outboard position further outboard than the inboard position. The outboard force moving the upper bracket and thus the cushion to the outboard position removes the inboard armrest assembly from projecting into the center aisle.

Second, the disclosure addresses that challenge with a seating assembly of a row of seating comprising (a) a seat including a frame having an inboard side and (b) an inboard armrest assembly including (i) a bracket having a lower portion attached to the inboard side of the frame of the seat and an upper portion disposed upward of the lower portion, (ii) laterally oriented slots disposed at the upper portion of the bracket, and (iii) a cushion having projections mounted within the slots, an inboard position and, upon application of an outboard force to the cushion that forces the projections to move within the slots, an outboard position further outboard than the inboard position. The outboard force moving the cushion to the outboard position removes the inboard armrest assembly from projecting into the center aisle.

According to a first aspect of the present invention, a seating assembly of a row of seating of a vehicle comprises: (a) a seat including a frame having an inboard side; and (b) an inboard armrest assembly comprising: (i) a lower bracket attached to the inboard side of the frame of the seat; (ii) an upper bracket pivotally coupled to the lower bracket about a pivot axis extending generally forward-to-rearward; and (iii) a cushion unit mounted upon the upper bracket, the upper bracket having an inboard position and, upon application of an outboard force to the upper bracket, an outboard position further outboard than the inboard position, the upper bracket transitioning from the inboard position to the outboard position about the pivot axis.

Embodiments of the first aspect of the invention can include any one or a combination of the following features:
- the outboard force moving the upper bracket and thus the cushion to the outboard position removes the inboard armrest assembly from projecting into a center aisle of a vehicle;
- in the outboard position, the upper bracket is rotated at least 5 degrees relative to the upper bracket while in the inboard position;
- in the outboard position, the upper bracket is rotated at least 10 degrees relative to the upper bracket while in the inboard position;
- the inboard armrest assembly further comprises a spring element biasing the upper bracket to the inboard position when the outboard force is not applied to the upper bracket;
- the lower bracket of the inboard armrest assembly comprises apertures through which fasteners extend to attach the lower bracket to the inboard side of the frame of the seat;
- the inboard armrest assembly further comprises an axle defining the pivot axis;
- the lower bracket comprises a pair of tabs extending inboard and holding the axle, the axle extending between the pair of tabs;
- the upper bracket comprises a pair of tabs extending inboard, each including an aperture through which the axle extends;
- the pair of tabs of the upper bracket are disposed between the pair of tabs of the lower bracket;
- the apertures of the lower bracket of the inboard armrest assembly are disposed outboard of the pivot axis;
- the inboard armrest assembly further comprises a spring element biasing the upper bracket to the inboard position when the outboard force is not applied to the upper bracket;
- the spring element includes a wound coil, a first end extending from the wound coil and contacting the upper bracket, and a second end extending from the wound coil and contacting the lower bracket;
- the axle extends through the wound coil;
- the upper bracket of the inboard armrest assembly further comprises a recess into which the first end of the spring element extends, the recess including an outboard facing surface that opposes the first end of the spring element and against which the first end of the spring element imposes an inboard biasing force;
- the lower bracket of the inboard armrest assembly further comprises a recess into which the second end of the spring element extends, the recess of the lower bracket including an outboard facing surface that opposes the second end of the spring element as the upper bracket transitions from the inboard position to the outboard position;
- the first end of the spring element extends from the wound coil facing an inboard surface of the upper bracket before entering the recess of the upper bracket;
- the second end of the spring element extends from the wound coil opposing an inboard surface of the lower bracket before entering the recess of the lower bracket;
- the lower bracket comprises an upper portion and an inboard facing surface at the upper portion;
- the upper bracket comprises a lower portion and an outboard facing surface at the lower portion, the outboard facing surface opposing the inboard facing surface of the lower bracket;
- both the inboard facing surface of the upper portion of the lower bracket and the outboard facing surface of the lower portion of the upper bracket are disposed outboard of the pivot axis, with a horizontal plane intersecting all of the pivot axis, the upper portion of the lower bracket, and the lower portion of the upper bracket;

the inboard facing surface of the upper portion of the lower bracket limits inboard rotational movement of the upper bracket about the pivot axis;

the upper portion of the lower bracket includes a top;

the top limits rotational movement of the upper bracket about the pivot axis outboard beyond the outboard position; and the top limits outboard rotational movement of the upper bracket about the pivot axis.

According to a second aspect of the present invention, a seating assembly of a row of seating of a vehicle comprises: (a) a seat including a frame having an inboard side; and (b) an inboard armrest assembly comprising: (i) a bracket including a lower portion attached to the inboard side of the frame of the seat and an upper portion disposed upward of the lower portion; and (ii) a cushion unit slidably coupled to the upper portion of the bracket, the cushion unit comprising an inboard position toward which the cushion is biased and an outboard position to which the cushion unit transitions upon application of an outboard force to the cushion unit that overcomes the bias toward the inboard position.

Embodiments of the second aspect of the invention can include any one or a combination of the following features:

the inboard armrest assembly further comprises a spring with an inboard end contacting the cushion unit and an outboard end contacting the upper bracket;

the spring biases the cushion unit to the inboard position;

application of the outboard force energizes the spring;

the upper portion of the bracket of the inboard armrest assembly comprises a platform with a floor and a plurality of guides that extend upwardly from the floor, each guide of the plurality of guides comprising a forward lateral surface, a rearward lateral surface, an inboard end, an outboard end, and a distance that separates the inboard end from the outboard end;

the cushion unit further comprises a platform disposed above and opposing the platform of the upper portion of the bracket, the platform comprising a bottom and a plurality of recesses extending upward from the bottom;

each recess of the plurality of recesses receives one of the guides of the plurality of guides;

each recess of the plurality of recesses comprises (i) a forward lateral surface disposed forward of the forward lateral surface of the guide of the plurality of guides that the recess has received, (ii) a rearward lateral surface disposed rearward of the rearward lateral surface of the guide of the plurality of guides that the recess has received, (iii) an inboard end disposed inboard of the inboard end of the guide of the plurality of guides that the recess had received, and (iv) an outboard end disposed outboard of the outboard end of the guide of the plurality of guides that the recess has received;

a distance that separates the inboard end from the outboard end of the each recess of the plurality of recesses is greater than a distance that separates the inboard end from the outboard end of the guide of the plurality of guides that the recess has received;

the inboard end of the guide of the plurality of guides that the recess has received contacts the inboard end of the recess to limit the outboard position of the cushion unit;

the outboard end of the guide of the plurality of guides that the recess has received contacts the outboard end of the recess to limit the inboard position of the cushion unit;

each recess of the plurality of recesses further comprises a top wall having a laterally extending slot with a longitudinal width; and each guide of the plurality of guides further comprises a projection with a first portion extending upward through the laterally extending slot of the recess that has received the guide and a second portion with a longitudinal width that is wider than the longitudinal width of the laterally extending slot of the recess, the second portion being disposed above the laterally extending slot of the recess.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
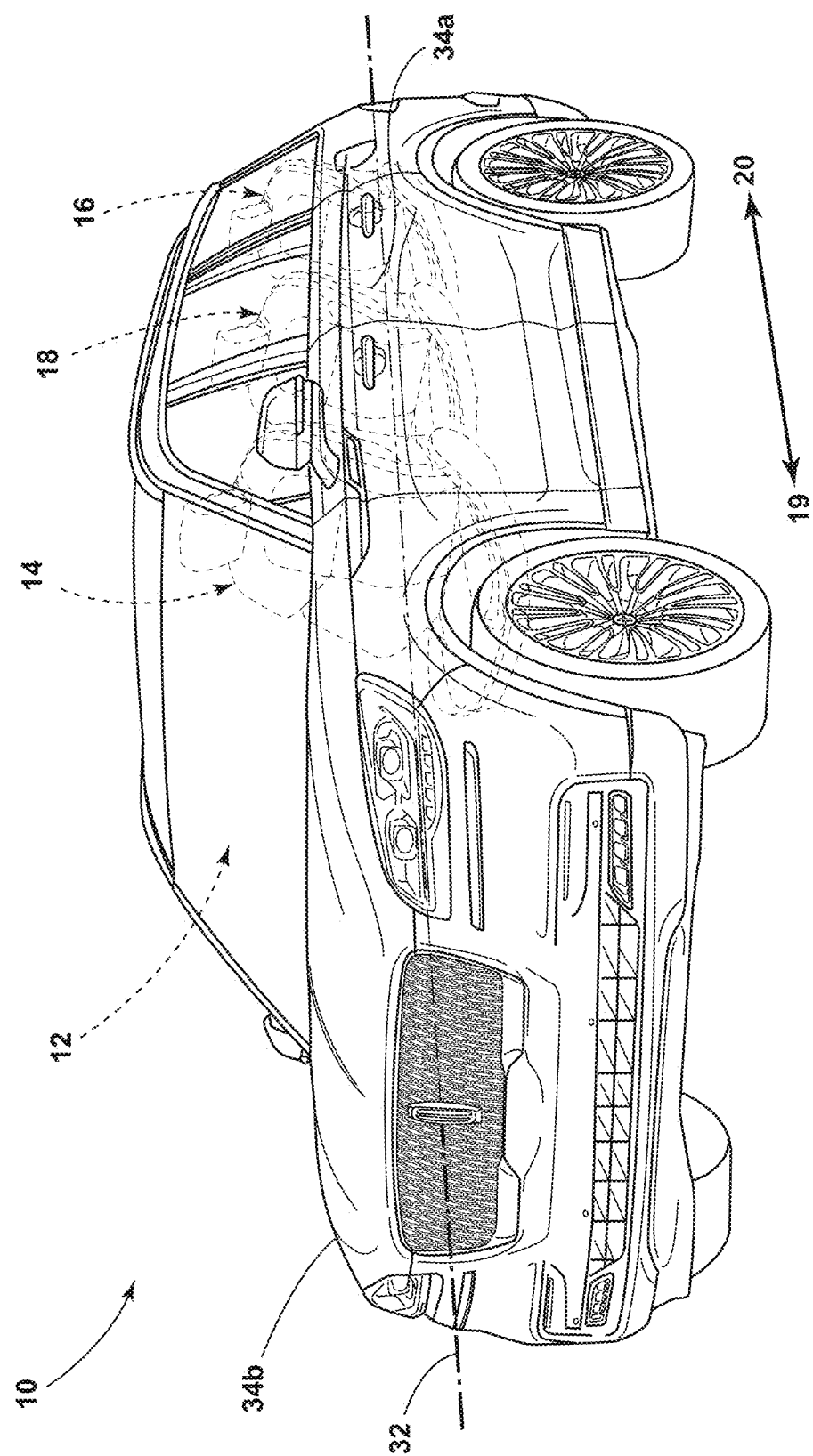
FIG. 1 is a perspective view of a vehicle having an interior, illustrating a centerline of a vehicle as well as forward and rearward directions.
Figure 2:
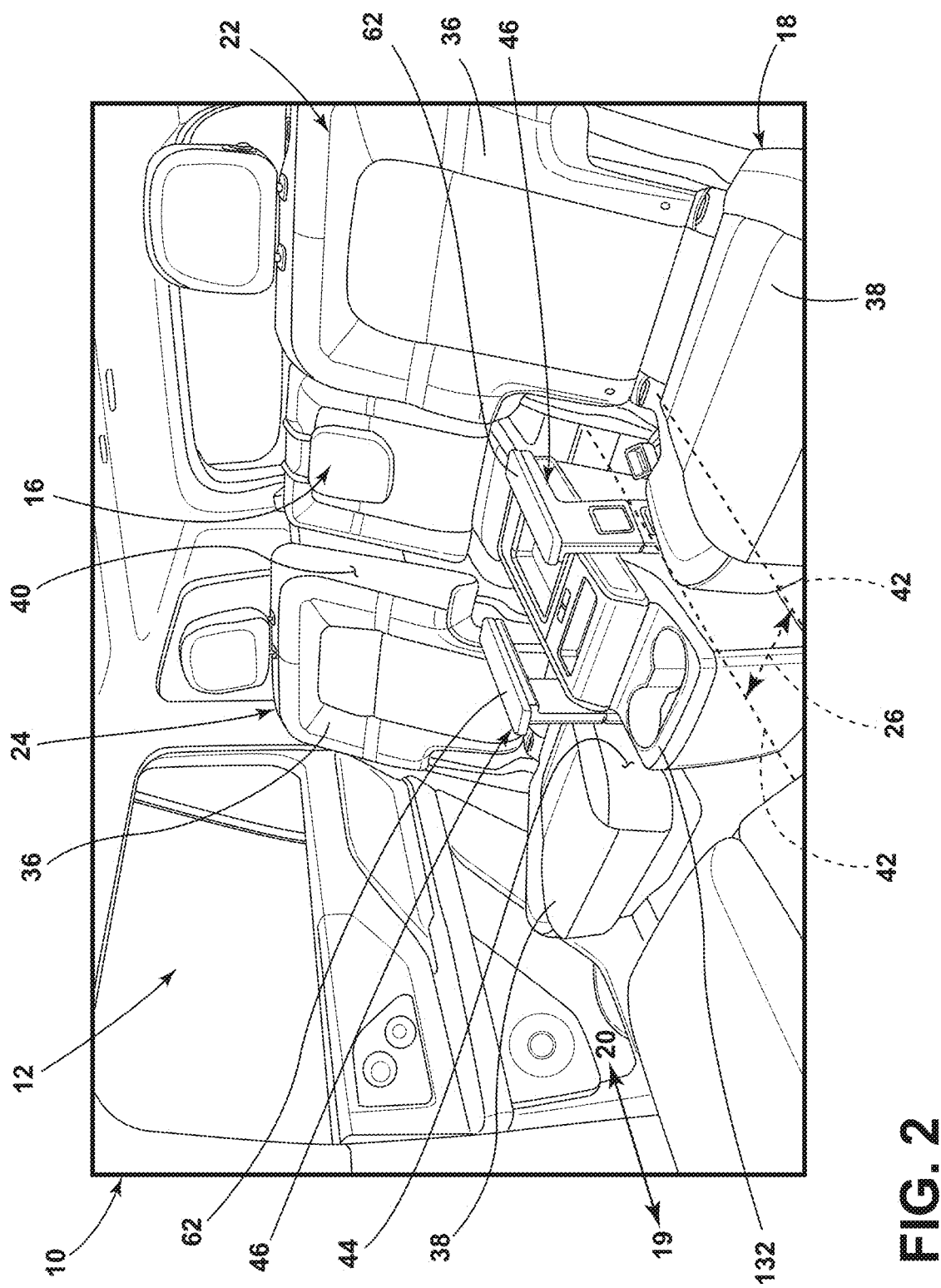
FIG. 2 is a perspective view of the interior of the vehicle of FIG. 1, illustrating an intermediate row of seating that includes a first row of seating and a second row of seating separated by a center aisle, and each of the first seating assembly and the second seating assembly having an inboard armrest assembly with a cushion unit in an inboard position projecting into the center aisle.
Figure 3:
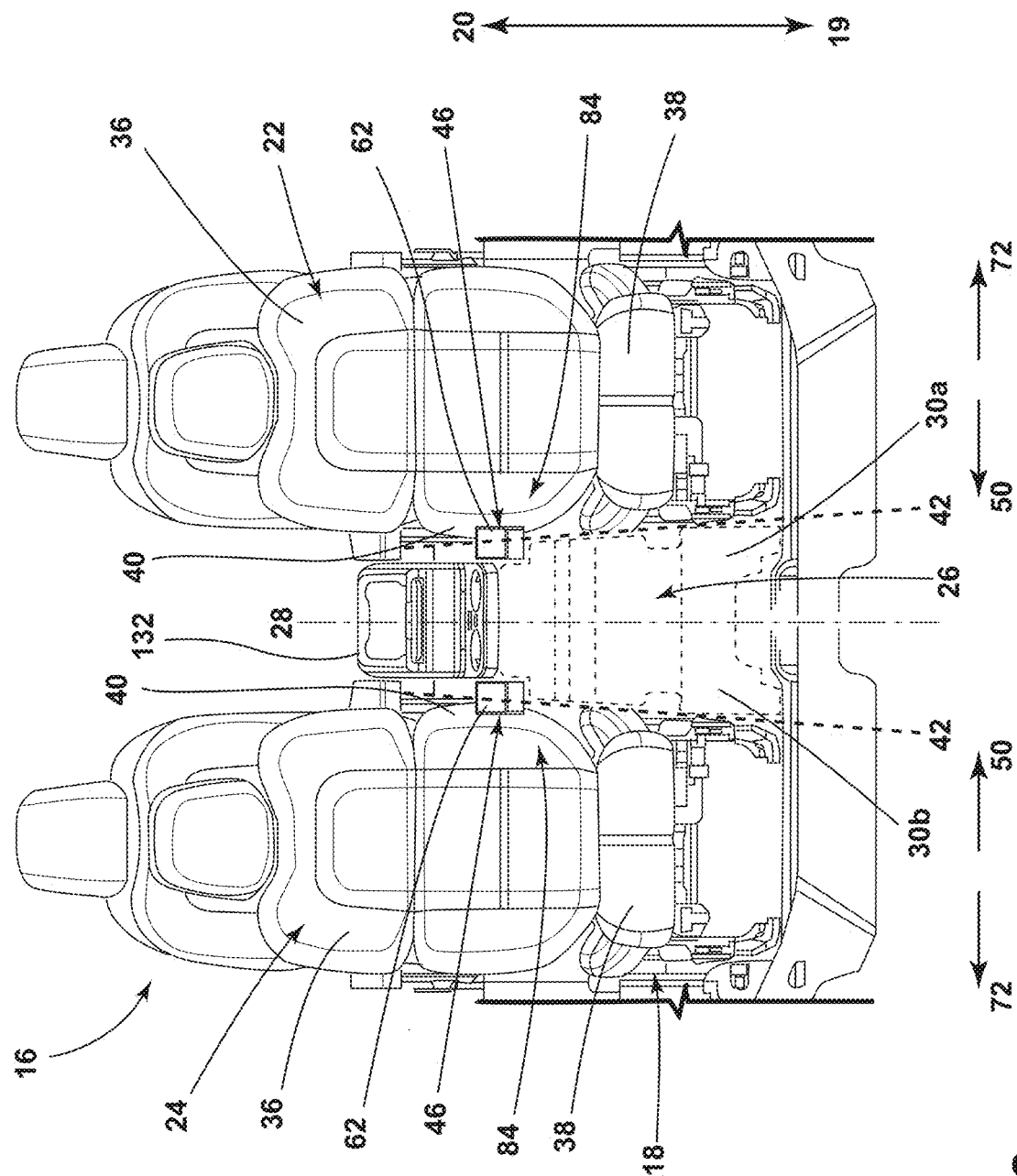
FIG. 3 is a view looking rearward within the interior of the vehicle of FIG. 1 toward the intermediate row of seating and a rearward row of seating disposed rearward of the intermediate row of seating, illustrating inboard and outboard directions, with the inboard direction being inwards towards a centerline of the aisle and the outboard direction being outwards away from the centerline of the aisle.

Referring to FIGS. 1-3, a vehicle 10 includes an interior 12. The vehicle 10 further includes a forward row of seating 14, a rearward row of seating 16, and an intermediate row of seating 18 between the forward row of seating 14 and the rearward row of seating 16. The vehicle 10 can further include additional rows of seating forward 19 of the forward row of seating 14 and rearward 20 of the rearward row of seating 16. The vehicle 10 can include more than one intermediate rows of seating 18. The forward row of seating 14 can be the first row of seating, i.e., the forward-most row of seating of the vehicle 10. The rearward row of seating 16 can be a third row of seating. The intermediate row of seating 18 can be a second row of seating disposed just rearward 20 of the forward row of seating 14 and just forward 19 of the rearward row of seating 16. The intermediate row of seating 18 includes a first seating assembly 22 and a second seating assembly 24. The vehicle 10 further includes an aisle 26 disposed between the first seating assembly 22 and the second seating assembly 24. The aisle 26 provides access from the intermediate row of seating 18 rearward 20 within the vehicle 10 such as to the rearward row of seating 16. In embodiments where the intermediate row of seating 18 includes only the first seating assembly 22 and the second seating assembly 24, the aisle 26 may be referred to as a center aisle 26.

The aisle 26 includes a centerline 28. An imaginary vertical plane extends through the centerline 28 conceptually dividing the aisle 26 into two approximately symmetrical sides 30a and 30b. Side 30a is nearest the first seating assembly 22, while the side 30b is nearest the second seating assembly 24. In environments where the aisle 26 is the center aisle 26, the centerline 28 can be coextensive with a centerline 32 of the vehicle 10. Akin to the centerline 28 of the aisle 26, an imaginary vertical plane extends through the centerline 32 of the vehicle 10 conceptually dividing the vehicle 10 into two approximately symmetrical sides 34a, 34b.

Each of the first seating assembly 22 and the second seating assembly 24 of the intermediate row of seating 18 includes a seatback 36 and a seat 38. The seatback 36 of both the first seating assembly 22 and the second seating assembly 24 includes inboard surface 40 facing the centerline 28 of the aisle 26, Likewise, the seat 38 of both the first seating assembly 22 and the second seating assembly 24 includes an inboard surface 44 facing the centerline 28 of the aisle 26. The inboard surface 40 and the inboard surface 44 define an outboard boundary 42 of the aisle 26.

Further, both the first seating assembly 22 and the second seating assembly 24 include an inboard armrest assembly 46. The inboard armrest assembly 46 of the second seating assembly 24 is a mirror image of inboard armrest assembly 46 of the first seating assembly 22 but otherwise identical. Accordingly, only the inboard armrest assembly 46 of the first seating assembly 22 will be further discussed in detail.

Figure 4:
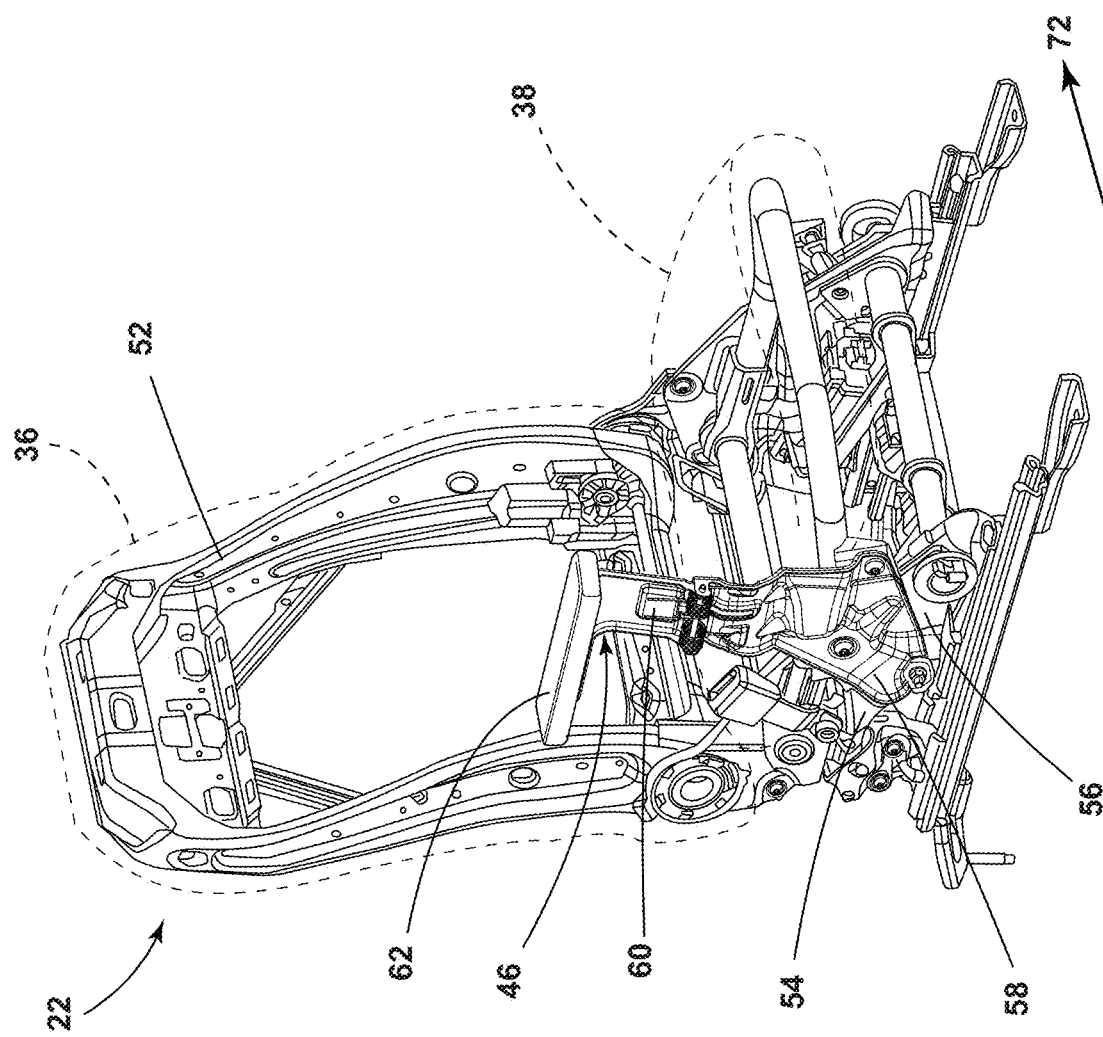
FIG. 4 is a perspective view of the first seating assembly, illustrating a seat with a frame, a seatback with a frame, and the inboard armrest assembly being attached to an inboard side of the frame of the seat via a lower bracket.
Figure 5:
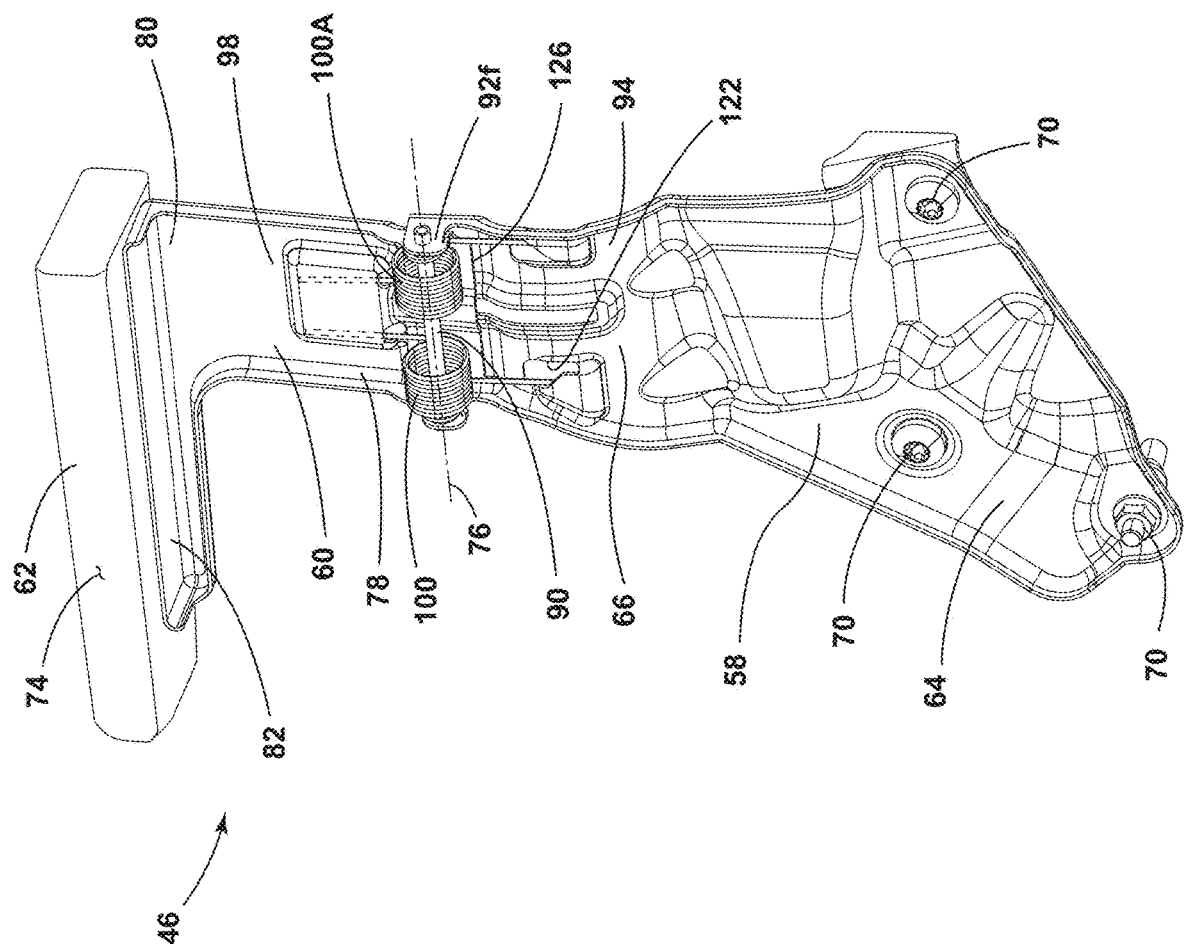
FIG. 5 is a perspective view of the inboard armrest assembly, illustrating an upper bracket pivotally attached to the lower bracket about a pivot axis.
Figure 6:
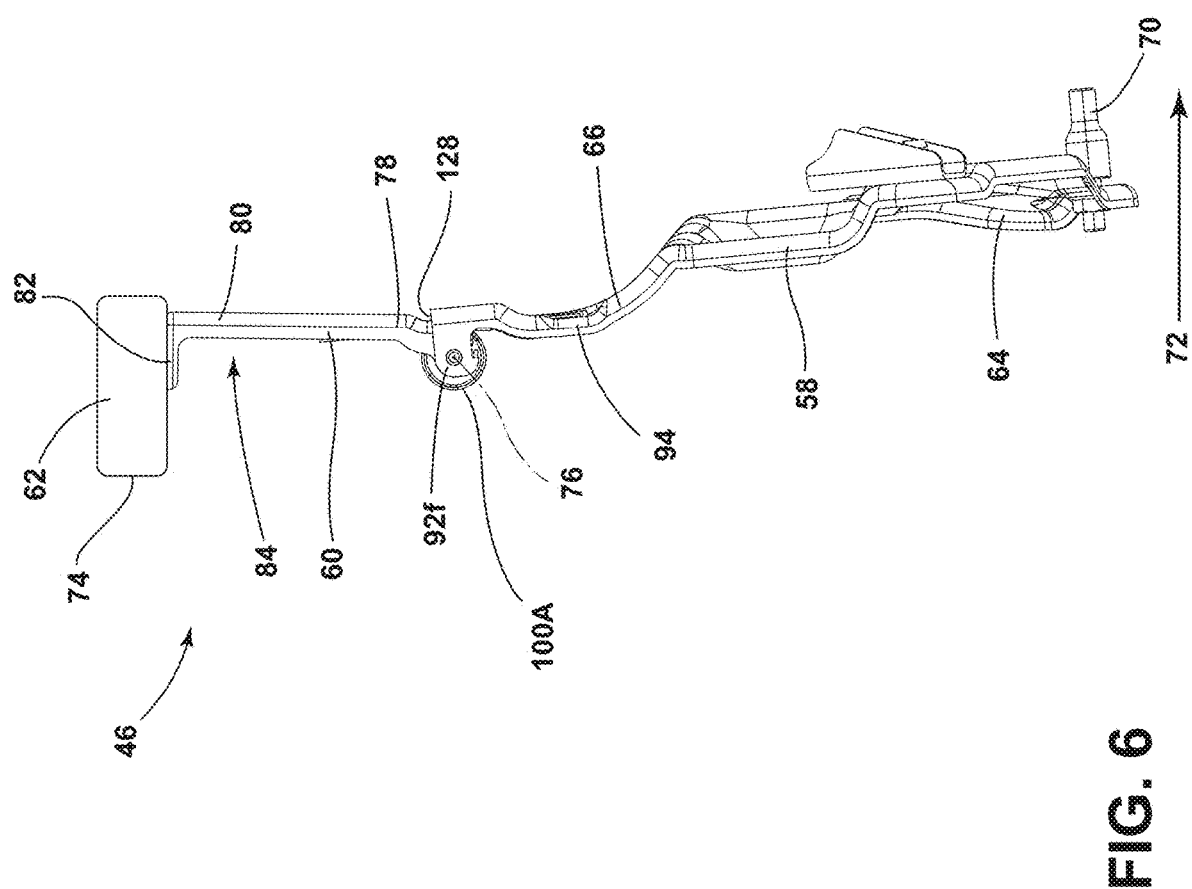
FIG. 6 is a front view of the inboard armrest assembly, illustrating a cushion unit attached to an upper portion of the upper bracket.
Figure 7:
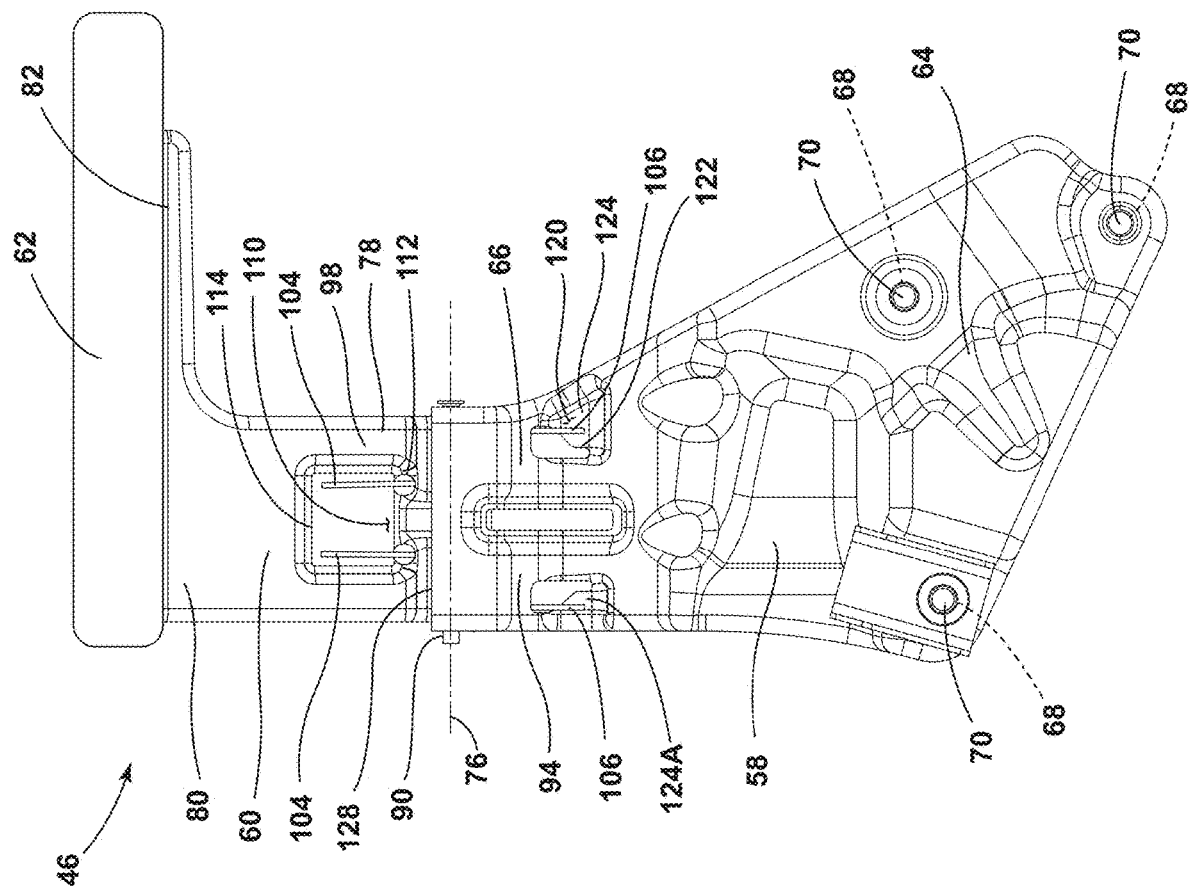
FIG. 7 is an outboard side view of the inboard armrest assembly, illustrating the lower bracket having apertures through which fasteners extend to attach the inboard armrest assembly to the inboard side of the frame of the seat.
Figure 8:
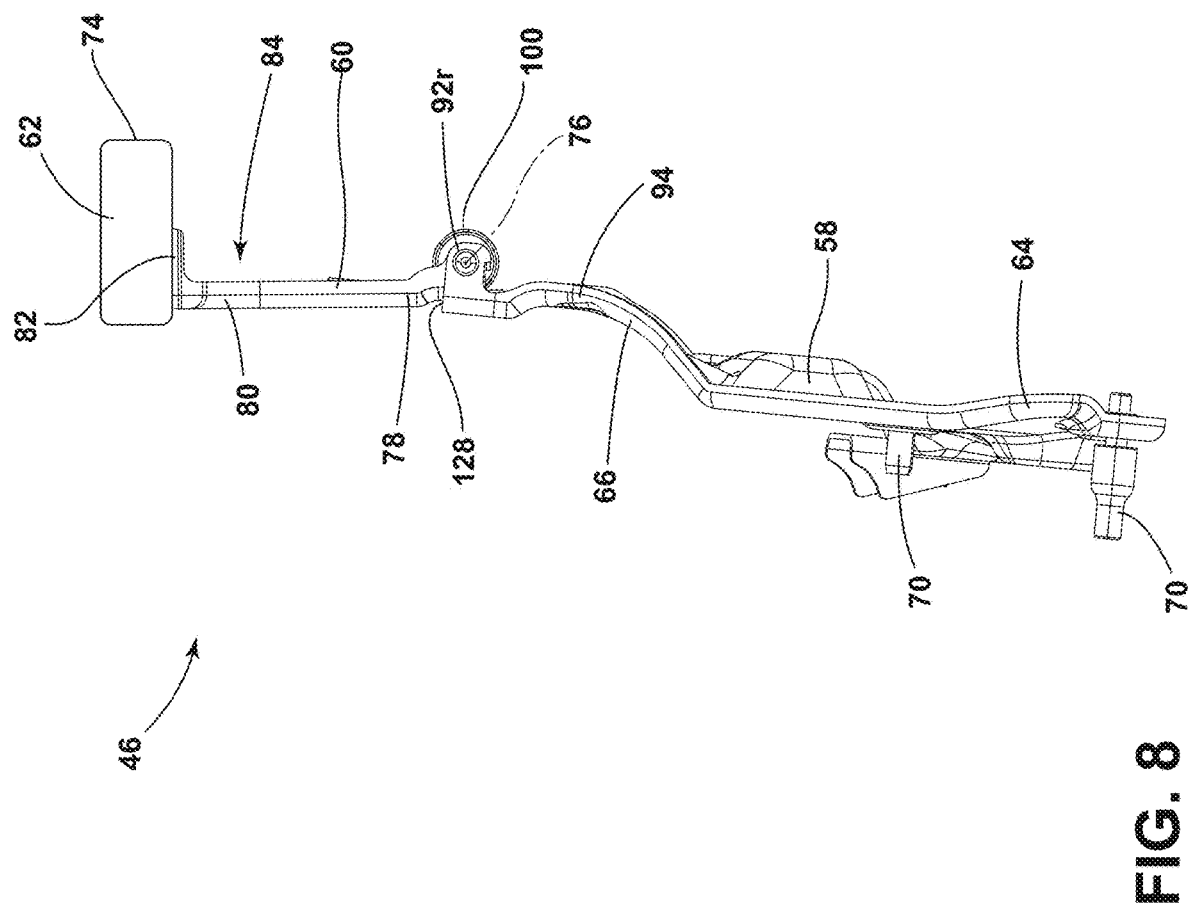
FIG. 8 is a rear view of the inboard armrest assembly, illustrating a top of the lower bracket being disposed vertically above the pivot axis.
Figure 9:
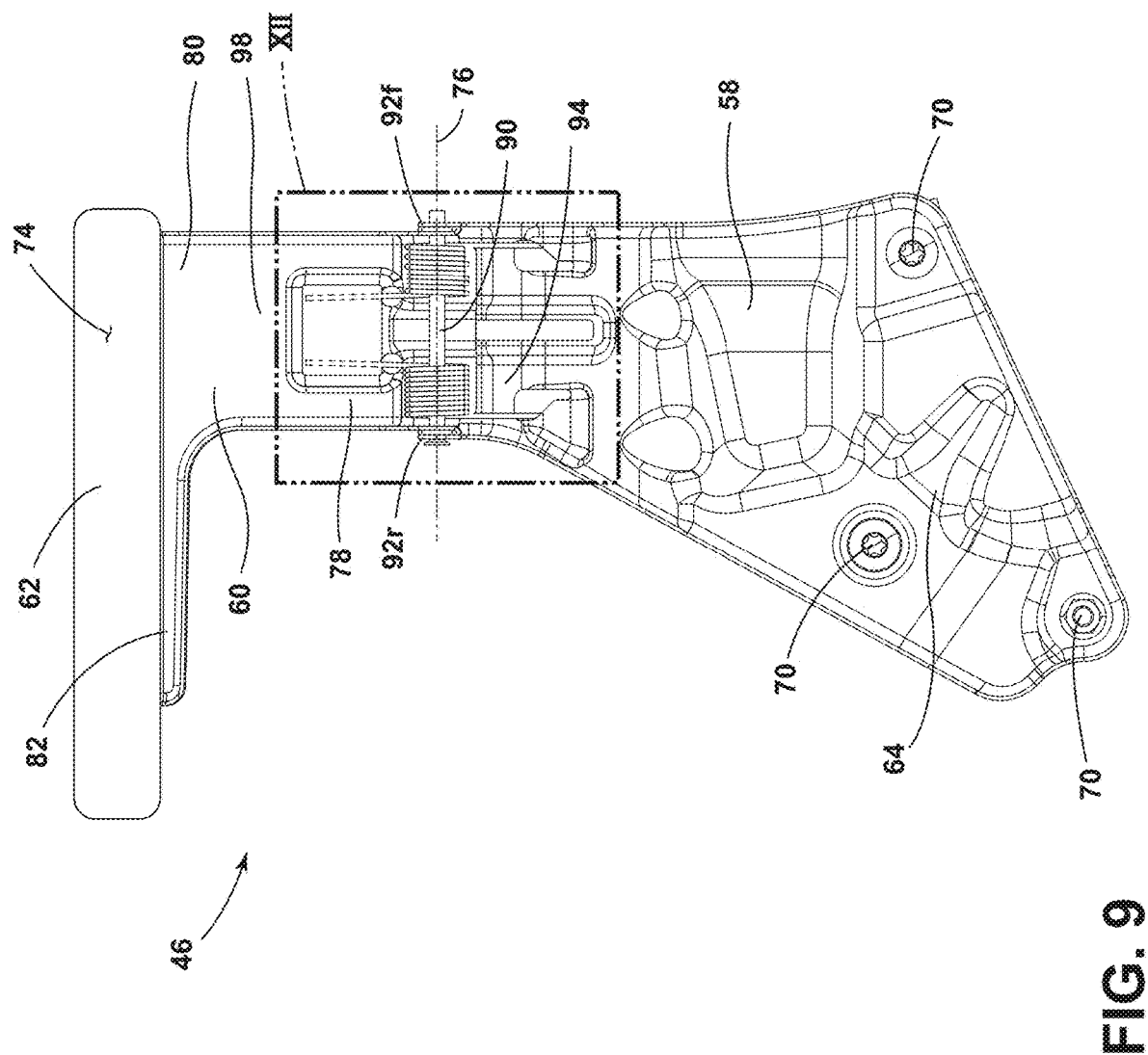
FIG. 9 is an inboard view of the inboard armrest assembly, illustrating the cushion unit having an inboard surface and the upper bracket having a platform upon which the cushion unit is mounted.
Figure 10:
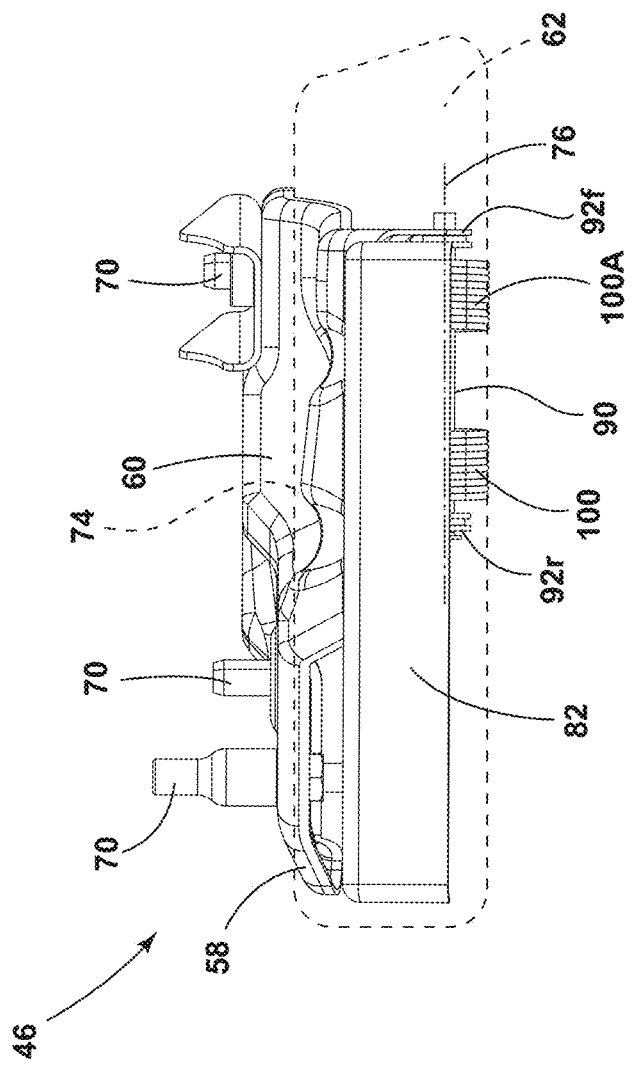
FIG. 10 is an overhead view of the inboard armrest assembly, illustrating an axle defining the pivot axis and extending between inboard extending tabs of the lower bracket, and spring elements biasing the upper bracket and thus the cushion unit to an inboard position.

Referring now additionally to FIG. 4, the seatback 36 and the seat 38 both include a frame 52 and a frame 54 respectively. The frame 54 of the seat 38 includes an inboard side 56. The inboard armrest assembly 46 is attached to the inboard side 56 of the frame 54 of the seat 38.

Referring now additionally to FIGS. 5-12, the inboard armrest assembly 46 includes a lower bracket 58, an upper bracket 60, and a cushion unit 62 mounted upon the upper bracket 60. The lower bracket 58 includes a lower portion 64 and an upper portion 66 disposed above (i.e., vertically higher than) the lower portion 64. The lower bracket 58 is attached to the inboard side 56 of the frame 54 of the seat 38. The lower bracket 58 includes apertures 68. Fasteners 70 extend through the apertures 68 to attach the lower bracket 58 to the inboard side 56 of the frame 54 of the seat 38. The apertures 68 can be disposed further outboard 72 than an inboard surface 74 of the cushion unit 62.

The upper bracket 60 of the inboard armrest assembly 46 is pivotally coupled to the lower bracket 58 about a pivot axis 76. The pivot axis 76 extends longitudinally—i.e., generally forward-to-rearward relative to the vehicle 10. The upper bracket 60 includes a lower portion 78 and an upper portion 80 above the lower portion 78. The upper portion 80 includes a platform 82 upon which the cushion unit 62 is mounted. The platform 82 is generally horizontal. The upper bracket 60 is pivotally coupled to the lower bracket 58 at the lower portion 78.

Figure 11:
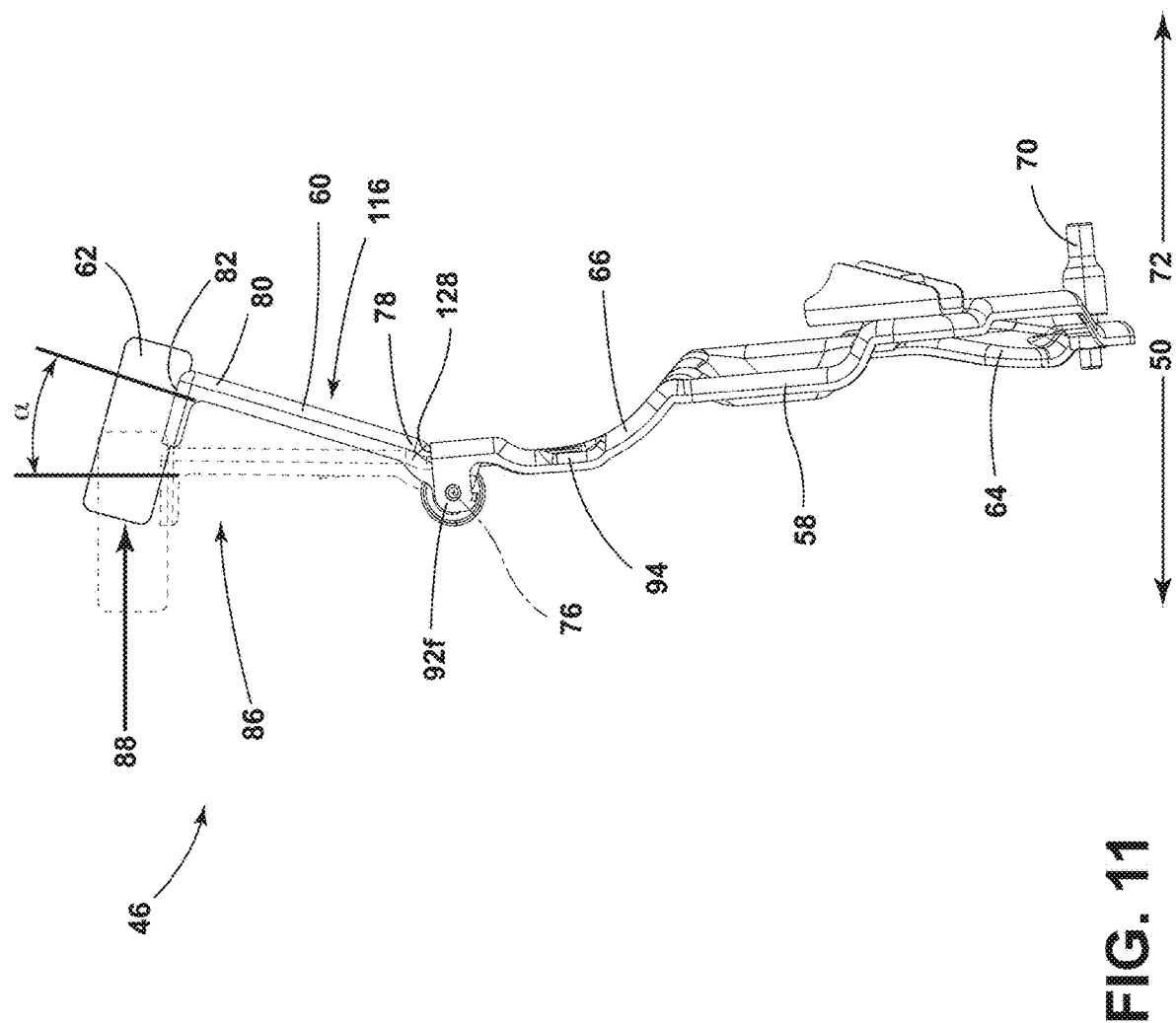
FIG. 11 is a front view of the inboard armrest assembly, illustrating an outboard force having moved the cushion unit to an outboard position further outboard than the inboard position about the pivot axis and the spring elements exerting an inboard biasing force to return the cushion unit to the inboard position upon expiration of the outboard force.
Figure 12:
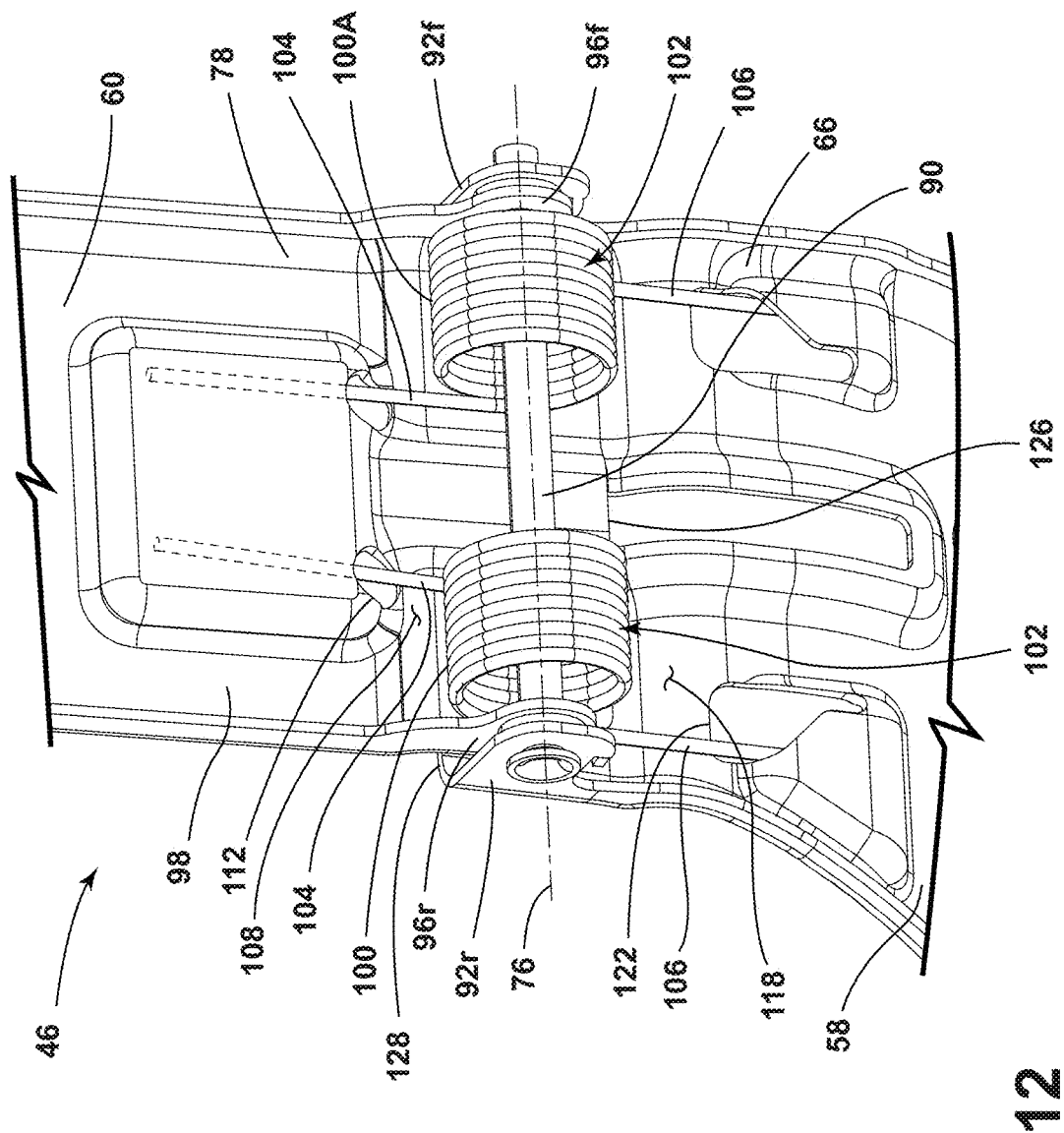
FIG. 12 is a close-up perspective view of area XII of FIG. 9, illustrating the axle extending through inboard projecting tabs of the upper bracket disposed between the inboard projecting tabs of the lower bracket, and the spring elements each having a wound coil through which the axle extends, a first end extending upward from the wound coil adjacent to an inboard facing surface of the upper bracket to terminate adjacent to an outboard facing surface of the upper bracket, and a second end extending downward from the wound coil adjacent to an inboard facing surface of the lower bracket to terminate adjacent to an outboard facing surface of the lower bracket.

The upper bracket 60 has an inboard position 84 (see, e.g., FIG. 6) and an outboard position 86 (see, e.g., FIG. 11). In embodiments, while in the inboard position 84, the cushion unit 62 of the inboard armrest assembly 46 extends inboard 50 into the aisle 26 closer to the centerline 28 than the inboard surfaces 40, 44 of the seatback 36 and the seat 38, respectively. The upper bracket 60, upon application of an outboard force 88 thereto, moves from the inboard position 84 to the outboard position 86. The upper bracket 60 transitions from the inboard position 84 to the outboard position 86 about the pivot axis 76. Upon application of the outboard force 88 moving the upper bracket 60 to the outboard position 86, the cushion unit 62 no longer projects into the aisle 26 of the vehicle 10 or does so to a lesser extent (in comparison to when upper bracket 60 is in the inboard position 84). In embodiments, in the outboard position 86, the upper bracket 60 is rotated about the pivot axis 76 an angle α that is at least 5 degrees relative to the upper bracket 60 while in the inboard position 84. In embodiments, the angle α is at least 10 degrees relative to the inboard position 84, such as 10 degrees to 45 degrees, 10 degrees to 20 degrees, or approximately 12 degrees.

The inboard armrest assembly 46 further includes an axle 90 that defines the pivot axis 76. In other words, the axle 90 rotates about the pivot axis 76 or allows the upper bracket 60 to rotate about the axle 90 providing the axis 76. In embodiments such as the illustrated embodiment, the lower bracket 58 includes a pair of tabs 92f, 92r that extend inboard 50 and holds the axle 90, with the axle 90 extending between the pair of tabs 92f, 92r. The pair of tabs 92f, 92r are disposed at the upper portion 66 of the lower bracket 58. The pair of tabs 92f, 92r extend inboard 50 from a generally longitudinal and vertical section 94 of the upper portion 66 of the lower bracket 58. The axle 90 is thus inboard 50 of the section 94 of the upper portion 66, as well as the lower portion 64 of the lower bracket 58. The apertures 68 at the lower portion 64 of the lower bracket 58 are thus disposed outboard 72 of the pivot axis 76 and thus the axle 90.

The upper bracket 60 includes a similar pair of tabs 96f, 96r extending inboard 50 from a generally longitudinal and vertical section 98 that extends from the lower portion 78 to the upper portion 80 of the upper bracket 60. Each tab 96 of the pair of tabs 96f, 96r includes an aperture (not illustrated) through which the axle 90 extends. The pair of tabs 96f, 96r of the upper bracket 60 are disposed between the pair of tabs 92f, 92r of the lower bracket 58. In other words, tab 92f of the lower bracket 58 is disposed forward 19 of the tab 96f of the upper bracket 60, which is disposed forward 19 of the other tab 96r of the upper bracket 60, which is disposed forward 19 of the other tab 92r of the lower bracket 58.

The inboard armrest assembly 46 further includes a spring element 100. The spring element 100 biases the upper bracket 60 to the inboard position 84 when the outboard force 88 is not applied to the upper bracket 60. The spring element 100 includes a wound coil 102, a first end 104 extending upward from the wound coil 102, and a second end 106 extending downward from the wound coil 102. The axle 90 extends through the wound coil 102. Thus, the spring element 100 is disposed longitudinally between the tabs 96f, 96r of the upper bracket 60. The first end 104 of the spring element 100 contacts the upper bracket 60. The second end 106 of the spring element 100 contacts the lower bracket 58.

The lower portion 78 of the upper bracket 60 includes an inboard facing surface 108 and an outboard facing surface 110 and an aperture 112 providing access from the inboard facing surface 108 to the outboard facing surface 110. The lower portion 78 further includes a recess 114 into the outboard facing surface 110. The first end 104 of the spring element 100 extends from the wound coil 102 facing the inboard facing surface 108, through the aperture 112, and into the recess 114 to terminate facing the outboard facing surface 110 within the recess 114. The outboard facing surface 110 at the recess 114 thus opposes the first end 104 of the spring element 100. The first end 104 of the spring element 100 imposes an inboard biasing force 116 onto the outboard facing surface 110 of the lower portion 78 of the upper bracket 60. When the upper bracket 60 is in the outboard position 86, and the outboard force 88 upon the upper bracket 60 ceases, the spring element 100 imposes the inboard biasing force 116 onto the upper bracket 60 to move the upper bracket 60 back to the inboard position 84.

The upper portion 66 of the lower bracket 58 includes an inboard facing surface 118, outboard facing surface 120, and an aperture 122 providing access from the inboard facing surface 118 to the outboard facing surface 120. The upper portion 66 of the lower bracket 58 further includes a recess 124 into the outboard facing surface 120. The second end 106 of the spring element 100 extends from the wound coil 102 opposing the inboard facing surface 118, then through the aperture 122, and then terminates facing the outboard facing surface 120 within the recess 124. The outboard facing surface 120 at the recess 124 thus opposes the second end 106 of the spring element 100. The outboard facing surface 120 at the recess 124 prevents the second end 106 of the spring element 100 from moving inboard 50 as the upper bracket 60 transitions from the inboard position 84 to the outboard position 86. In embodiments, the second end 106 of the spring element 100 is disposed closer to the tabs 96r, 92r of the upper bracket 60 and the lower bracket 58, respectively, than the first end 104.

In embodiments such as the illustrated embodiment, the inboard armrest assembly 46 includes a second spring element 100A. Like the first spring element 100, the second spring element 100A includes the wound coil 102, the first end 104 extending from the wound coil 102, and the second end 106 extending from the wound coil 102. The first end 104 extends upward from the wound coil 102 to terminate within the recess 114 disposed at the upper bracket 60, in the same manner as the first end 104 of the spring element 100. Likewise, the second end 106 extends downward from the wound coil 102 into a recess 124A of the lower bracket 58, in the same manner as the second end 106 of the spring element 100. The second end 106 of the second spring element 100A is disposed closer to the tabs 96f, 92f of the upper bracket 60 and the lower bracket 58, respectively, than the first end 104 of the second spring element 100A.

The inboard facing surface 118 of the upper portion 66 of the lower bracket 58 limits inboard 50 rotational movement of the upper bracket 60 about the pivot axis 76 beyond the inboard position 84. Specifically, in the illustrated embodiment, both the inboard facing surface 118 of the upper portion 66 of the lower bracket 58 and the outboard facing surface 110 of the lower portion 64 of the upper bracket 60 are disposed outboard 72 of the pivot axis 76 (defined here by the axle 90). A horizontal plane intersects all of the pivot axis 76 (and thus the axle 90), the upper portion 66 of the lower bracket 58, and the lower portion 78 of the upper bracket 60. Assuming that the upper bracket 60 is in the inboard position 84, further force inboard 50 upon the upper bracket 60 (such as inboard biasing force 116) would cause a bottom 126 of the lower portion 78 of the upper bracket 60 to move outboard 72 (because the bottom 126 is vertically below the pivot axis 76). However, the inboard facing surface 118 of the upper portion 66 of the lower bracket 58 abuts the bottom 126 of the lower portion 78 of the upper bracket 60 and thus prevents outboard 72 movement of the bottom 126 and thus prevents further inboard 50 rotation of the upper bracket 60 about the pivot axis 76.

Similarly, the lower bracket 58 limits rotational movement of the upper bracket 60 about the pivot axis 76 outboard 72 beyond the outboard position 86. Specifically, in the illustrated embodiment, the upper portion 66 of the lower bracket 58 includes a top 128. The top 128 of the upper portion 66 of the lower bracket 58 is disposed vertically above the bottom 126 of the upper bracket 60. Assuming that the upper bracket 60 is in the outboard position 86 (see FIG. 11), further outboard force 88 upon the upper bracket 60 would cause the outboard facing surface 110 of the upper bracket 60 at the lower portion 78 to contact the top 128 of the upper portion 66 of the lower bracket 58. The top 128 contacting the outboard facing surface 110 prevents further outboard 72 rotation of the upper bracket 60 about the pivot axis 76 beyond the outboard position 86. In other words, the top 128 of the lower bracket 58 and the lower portion 78 of the upper bracket 60 cooperate to define the outboard 72 limit of the outboard position 86.

Figure 13:
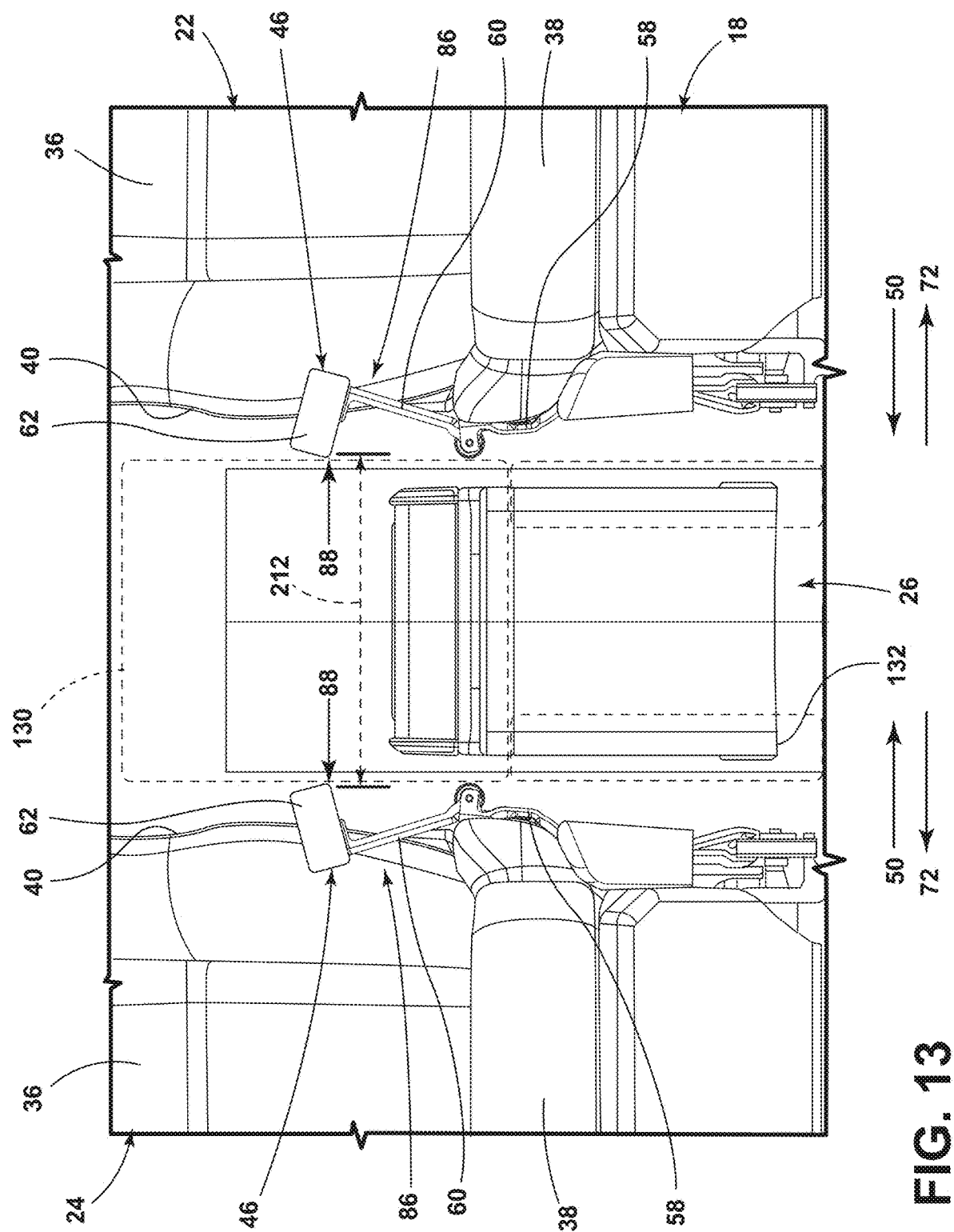
FIG. 13 is a view looking rearward within the interior of the vehicle toward the intermediate row of seating, illustrating the exertion of an outboard force upon the cushion units of the inboard armrest assemblies of both the first seating assembly and the second seating assembly, thus rotating the cushion units to the outboard position about the pivot axis.
Figure 14:
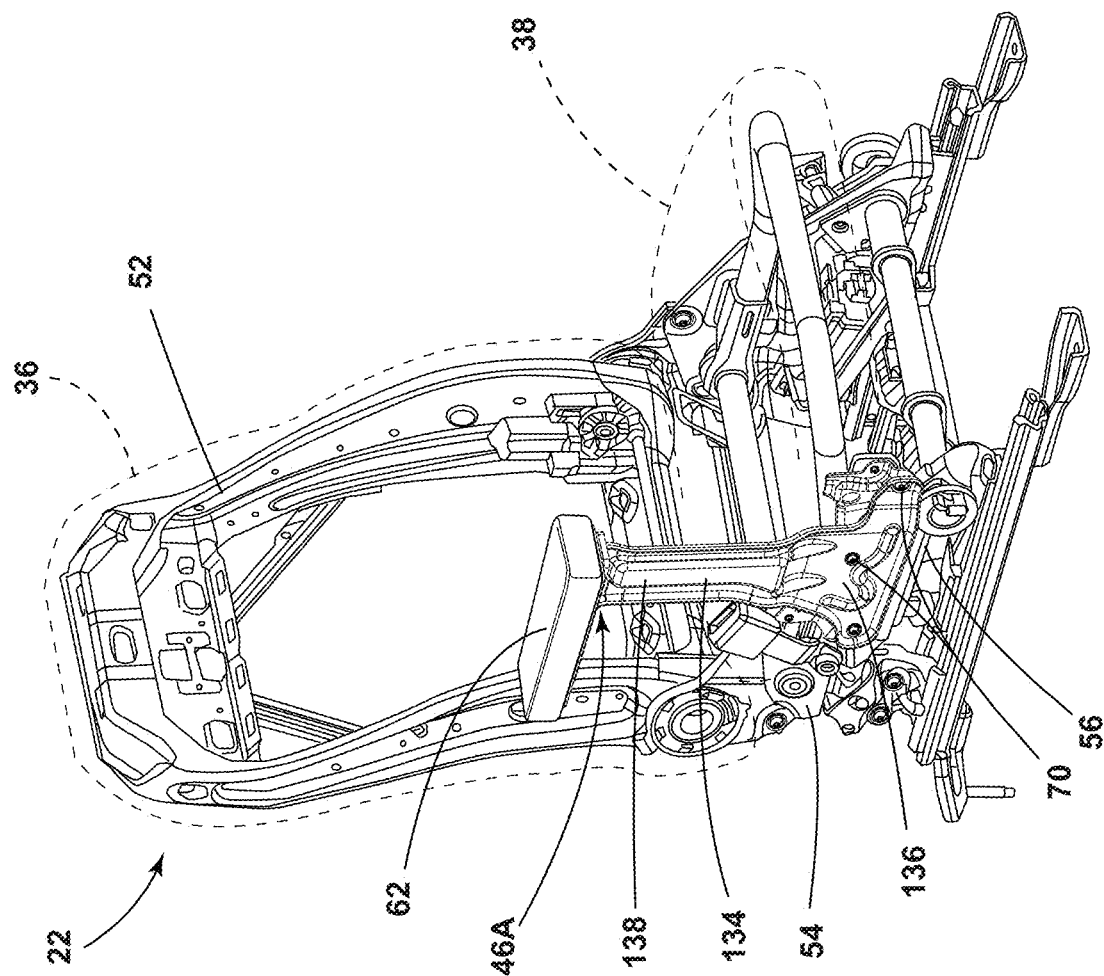
FIG. 14 is a perspective view of the first seating assembly but this time with an alternative embodiment inboard armrest assembly attached to the inboard side of the frame of the seat.
Figure 15:
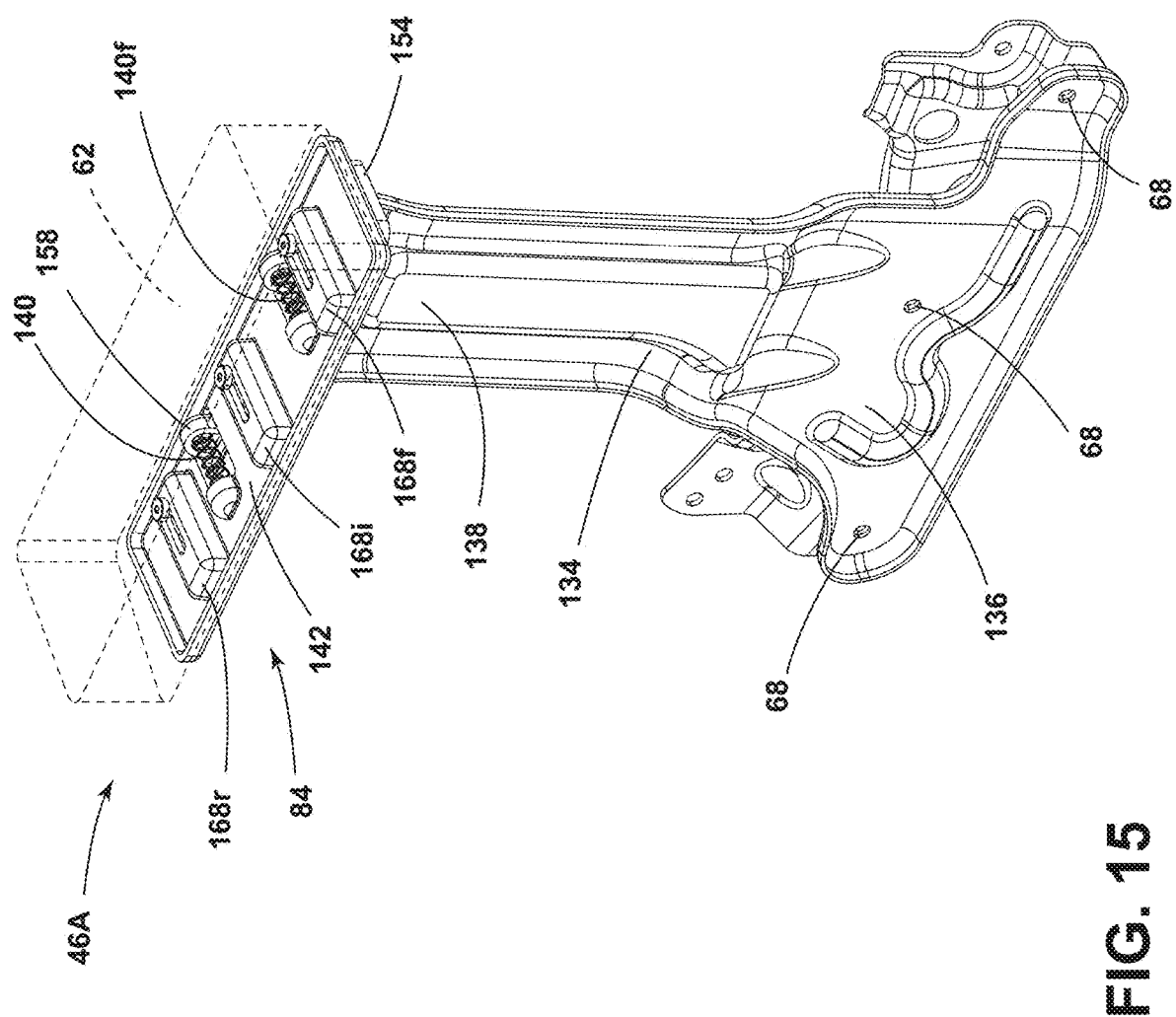
FIG. 15 is a perspective view of the inboard armrest assembly of FIG. 14, illustrating a bracket fastened to the inboard side of the frame via fasteners, and a cushion unit in phantom mounted upon a base structure that is slidably coupled to a platform of the bracket.
Figure 16:
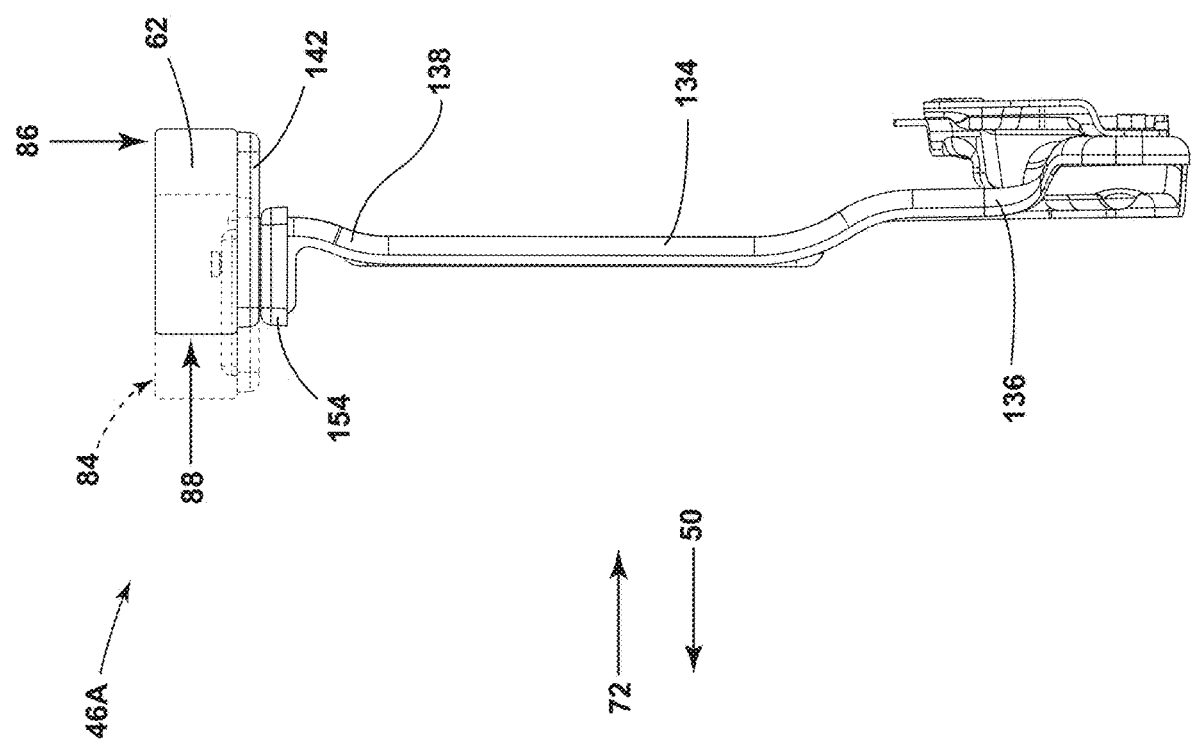
FIG. 16 is a front view of the inboard armrest assembly of FIG. 14, illustrating an outboard force having moved the cushion unit from the inboard position to an outboard position, with the base structure of the cushion unit having slid upon the platform of the bracket.
Figure 17:
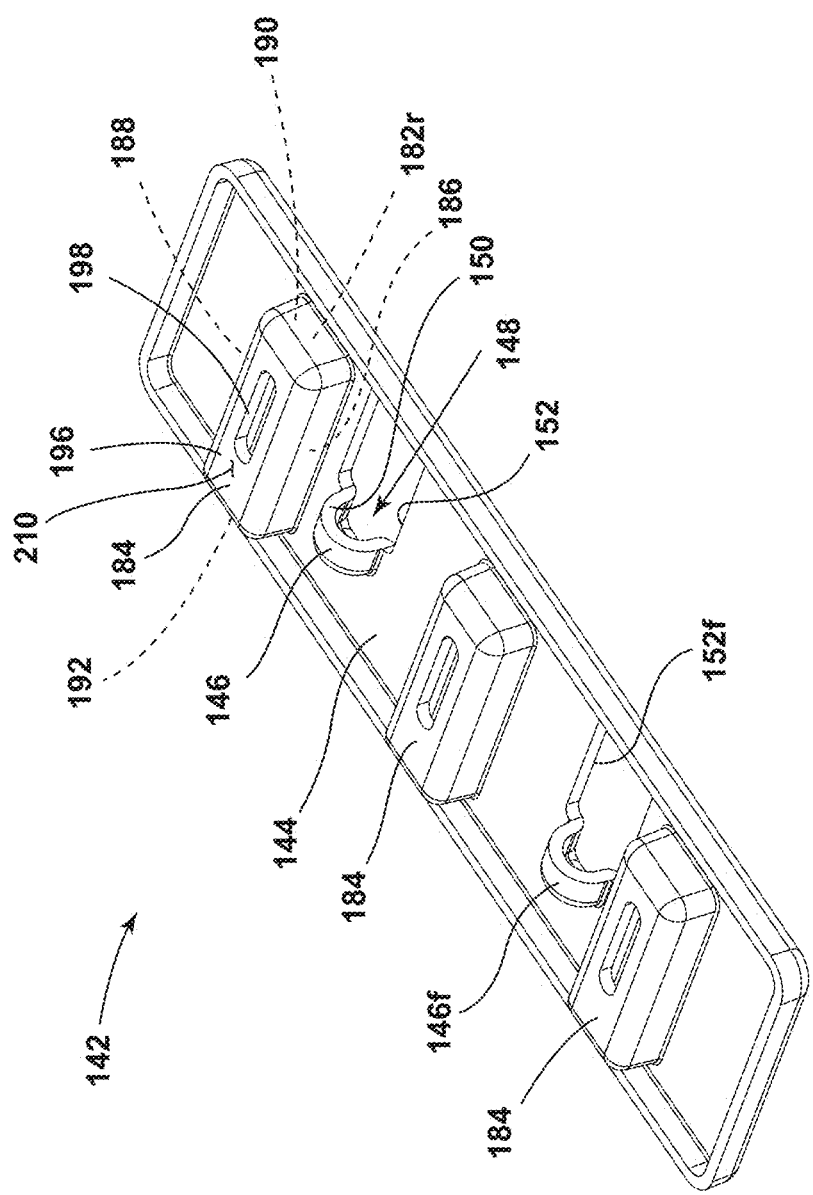
FIG. 17 is a top perspective view of the base structure, illustrating recesses forming raised portions that extend upward from a floor to receive guides from the platform of the bracket, and several domes to cooperate with, and maintain in position, spring elements that bias the cushion unit back to the inboard position upon expiration of the outboard force.
Figure 18:
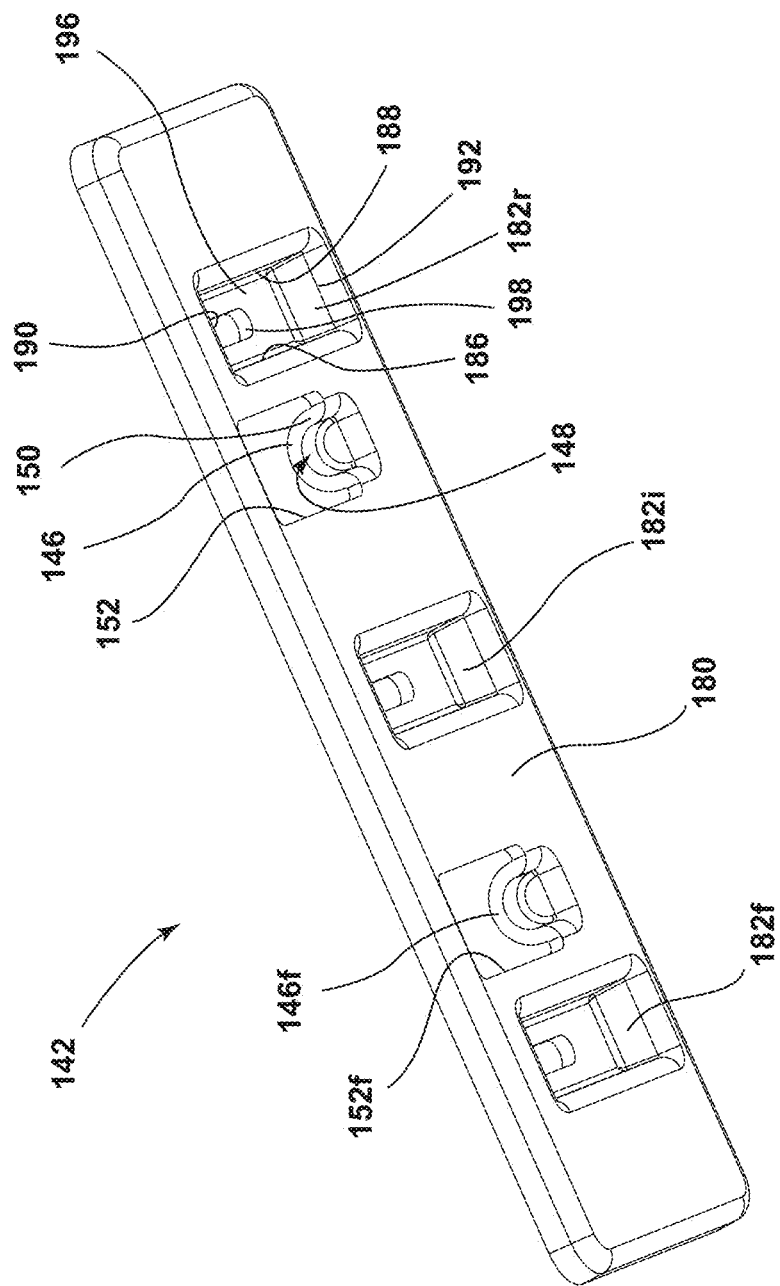
FIG. 18 is a bottom perspective view of the base structure, illustrating each recess having a forward lateral surface opposing a rearward lateral surface, a first end opposing a second end, and a slot extending through a top wall.
Figure 19:
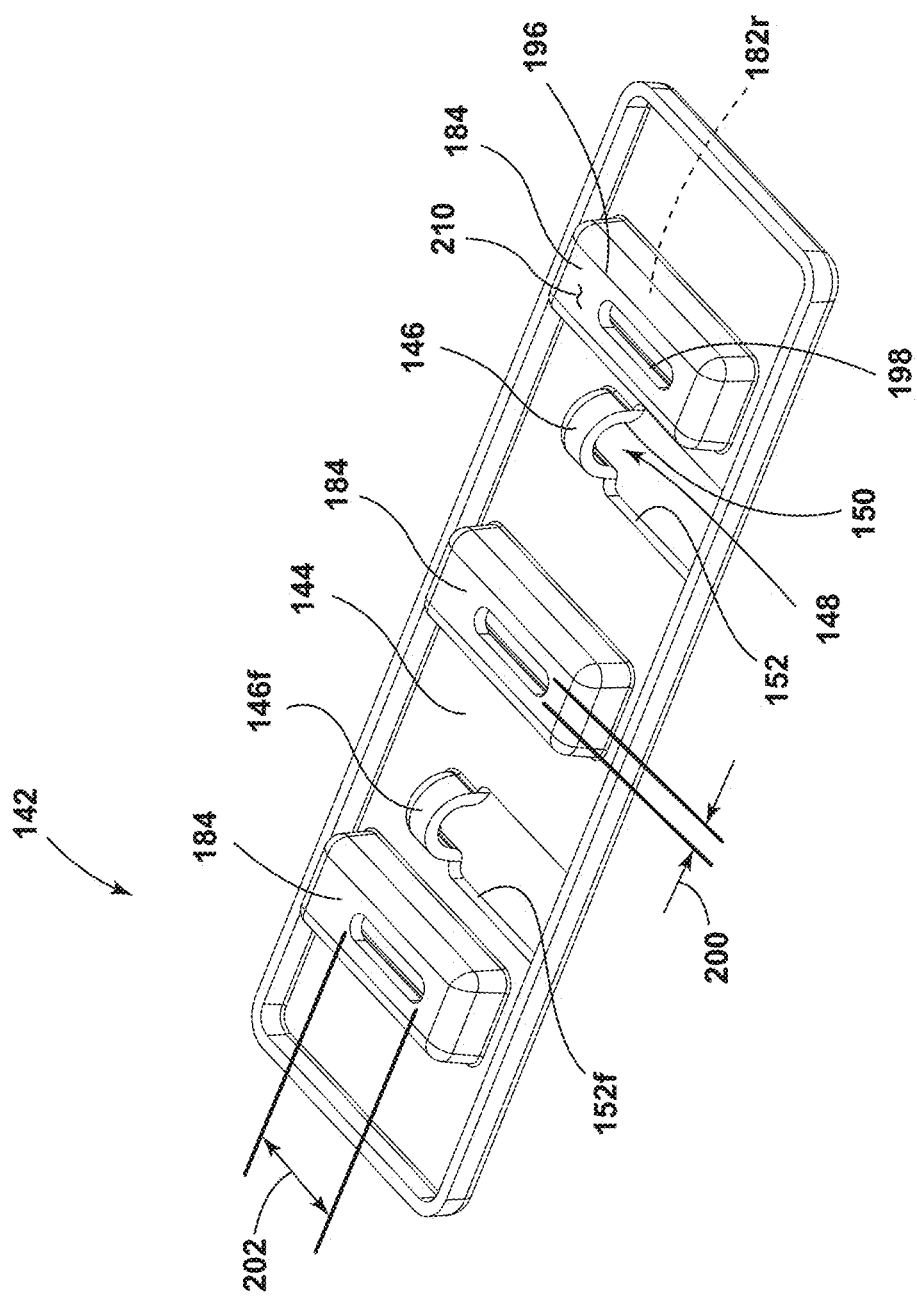
FIG. 19 is another top perspective view of the base structure, illustrating the slot through the top wall of the recess having a longitudinal width and a lateral length.
Figure 20:
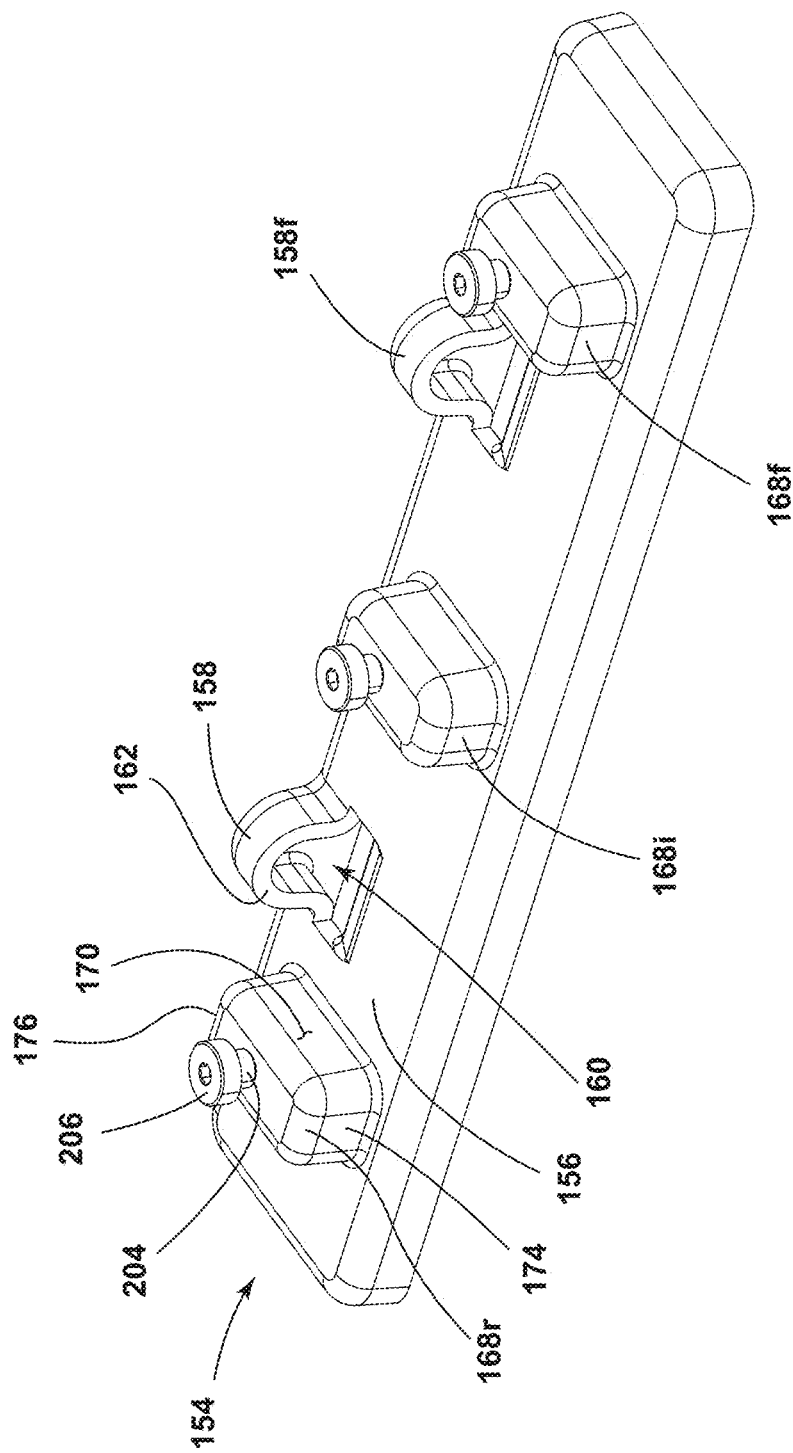
FIG. 20 is a top perspective view of the platform of the bracket, illustrating domes extending upward from a floor to oppose the domes of the base structure and maintain the spring elements in position, the domes of the base structure moving closer to the domes of the platform and energizing the spring elements as the outboard force pushes the cushion unit to the outboard position.
Figure 21:
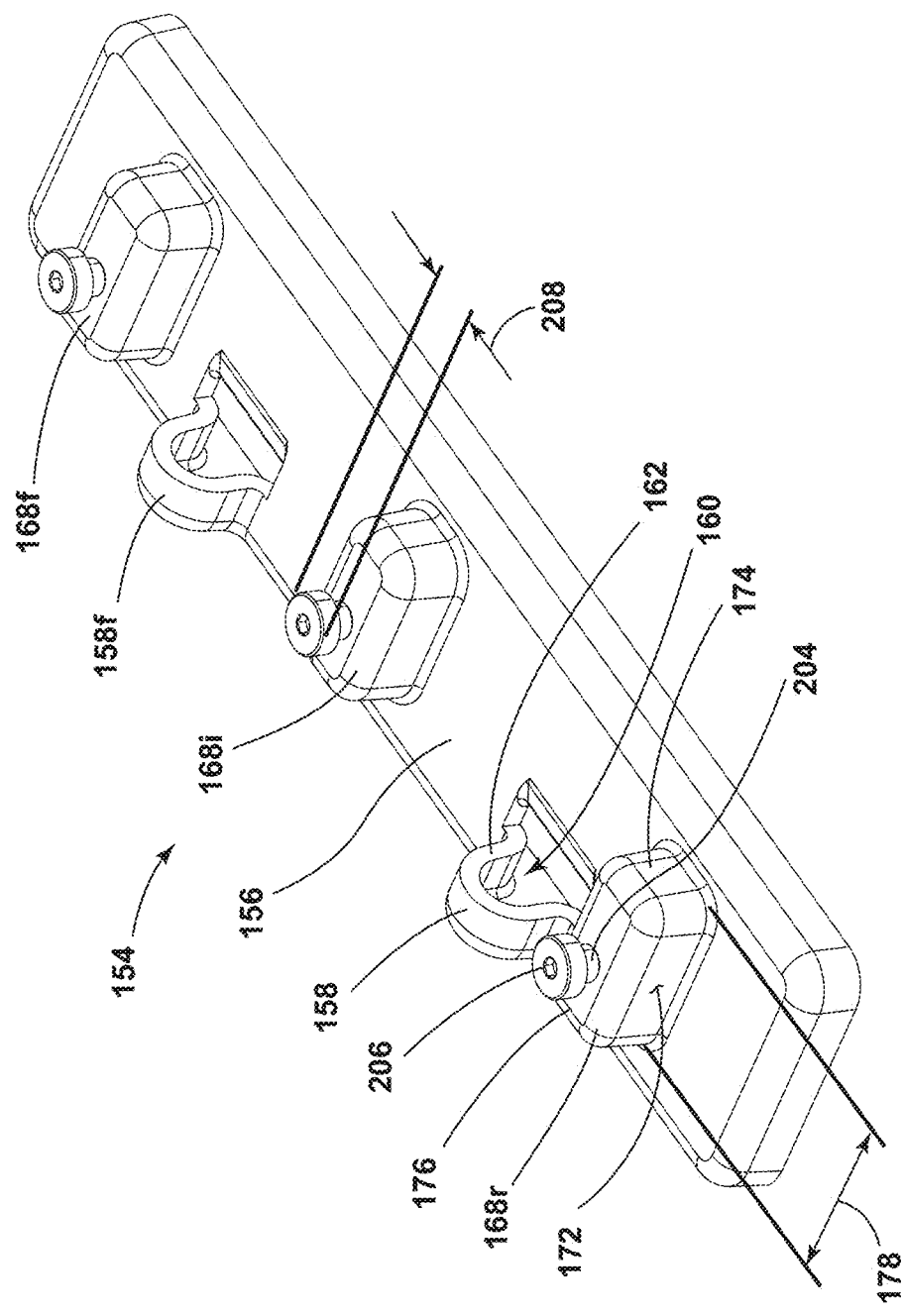
FIG. 21 is another top perspective view of the platform of the bracket, illustrating guides extending upward from the floor to be received by the recesses of the base structure of the cushion unit, each guide having a projection extending upward that terminates in an end that has a longitudinal width that is wider than the longitudinal width of the slot of the base structure of the cushion unit.
Figure 22:
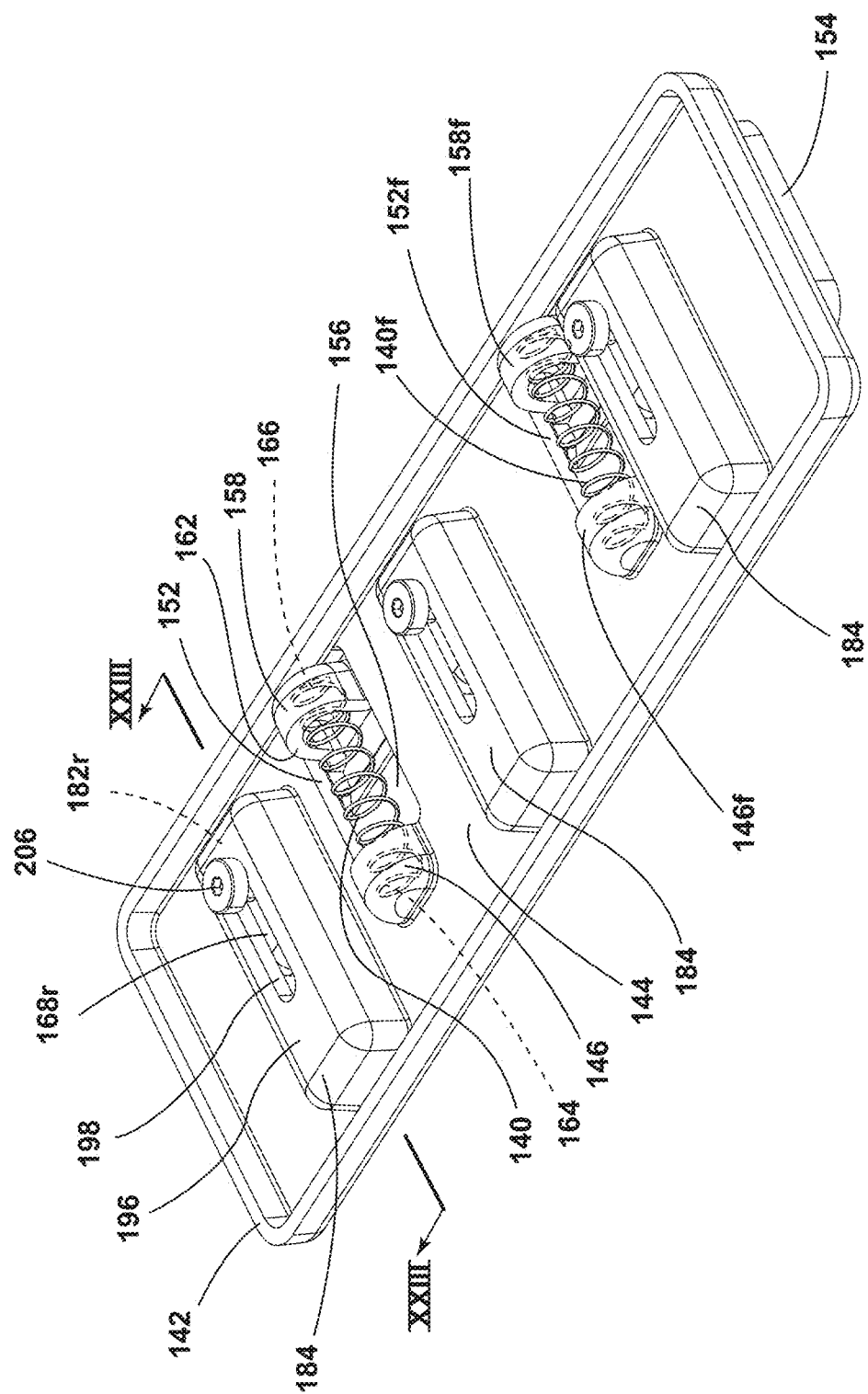
FIG. 22 is a top perspective view of the base structure of the cushion unit set upon the platform of the bracket, illustrating the domes of the platform of the bracket extending upward through an aperture of the floor of the base structure of the cushion unit to oppose the domes of the base structure of the cushion unit and maintain the spring elements in position, and each recess of the base structure of the cushion unit having received one of the guides of the platform of the bracket to define and limit the inboard and outboard sliding movement of the cushion unit.
Figure 23:
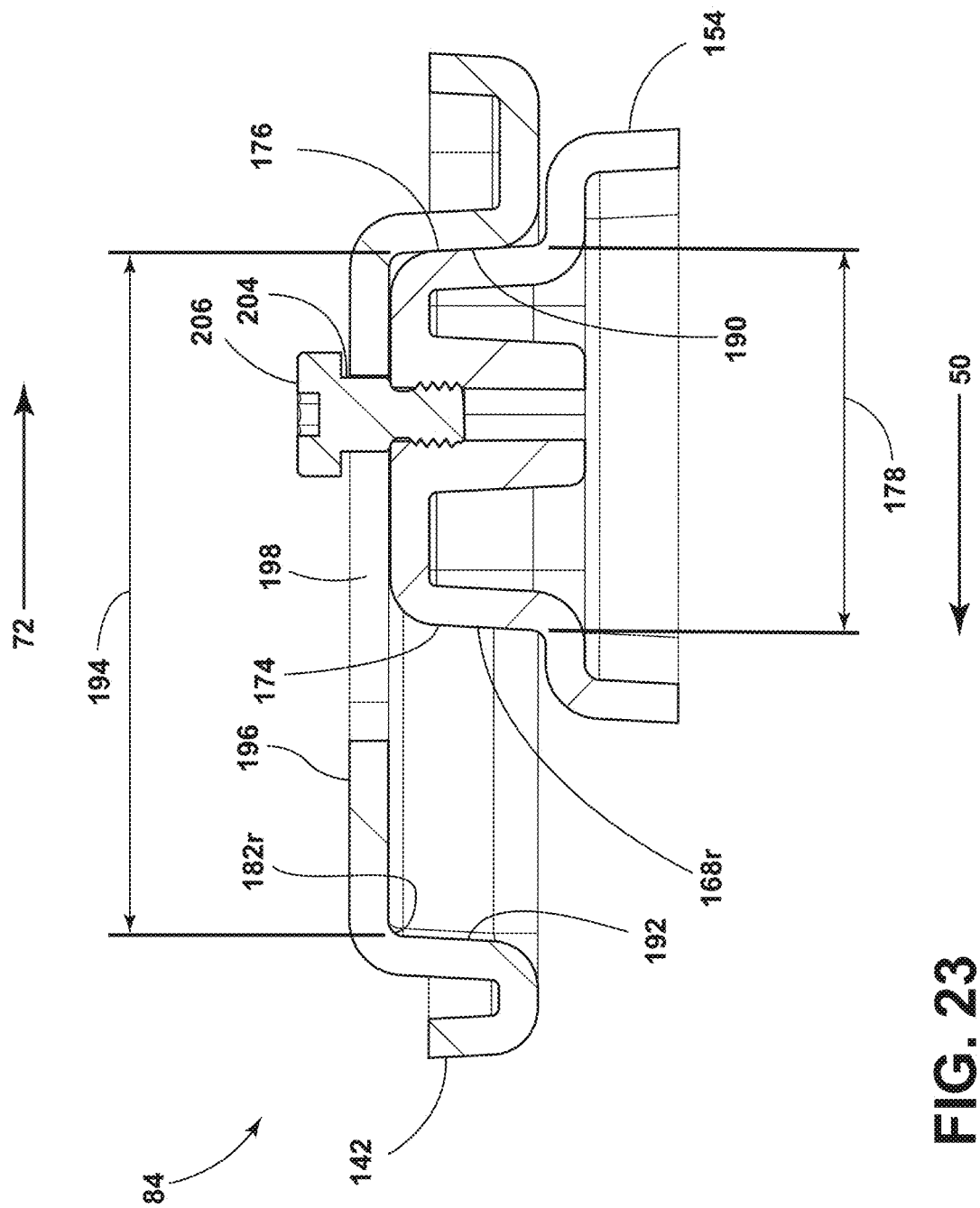
FIG. 23 is a front elevational view of the cross section taken through line XXIII-XXIII of FIG. 22, illustrating an inboard end and an outboard end of the recess of the base structure of the cushion unit being separated by a distance that is greater than a distance separating an inboard end and an outboard end of the guide of the platform of the bracket, and the projection from the guide extending upward through the top wall of the recess receiving the guide, with the end of the projection opposing the top wall of the recess.

Referring now additionally to FIG. 13, in use, a passenger 130 moving through the aisle 26 between the first seating assembly 22 and the second seating assembly 24 of the intermediate row of seating 18 toward the rearward row of seating 16, such as to move a modular center console 132 to the rearward row of seating 16 can impose the outboard force 88 upon the cushion units 62 of the inboard armrest assemblies 46 to cause the upper brackets 60 thereof to move to the outboard position 86 so that the cushion units 62 no longer project into the aisle 26 (or project into the aisle 26 to a lesser extent). The cushion units 62 of the inboard armrest assemblies 46 thus do not impede movement rearward 20 through the aisle 26 within the interior 12 of the vehicle 10 to the rearward row of seating 16 from the intermediate row of seating 18. After the passenger 130 has moved rearward 20 past the intermediate row of seating 18, the passenger 130 stops imparting the outboard force 88, at which point the spring element 100 (and second spring element 100A) causes the upper bracket 60 to move back to the inboard position 84.

Referring now to FIGS. 14-23, another embodiment inboard armrest assembly 46A includes a bracket 134 and a cushion unit 62 slidably coupled to the bracket 134. The bracket 134 includes a lower portion 136 that is attached to the inboard side 56 of the frame 54 of the seat 38. The bracket 134 further includes an upper portion 138 disposed upward of the lower portion 136. The lower portion 136 of the bracket 134 includes apertures 68. Fasteners 70 extend through the apertures 68 and into the inboard side 56 of the frame 54 of the seat 38 to attach the bracket 134 to the seat 38.

The cushion unit 62 is slidably coupled to the upper portion 138 of the bracket 134. The cushion unit 62 has an inboard position 84 and an outboard position 86. The cushion unit 62 slides from the inboard position 84 to the outboard position 86 upon application of the outboard force 88 to the cushion unit 62.

The inboard armrest assembly 46 further includes a spring element 140 that biases the cushion unit 62 to the inboard position 84. In the illustrated embodiment, the cushion unit 62 includes a base structure 142. The base structure 142 includes a floor 144 and a dome 146 that extends upward from the floor 144. The dome 146 is hollow with an opening 148 into the dome 146 at an outboard side 150 of the dome 146. The base structure 142 further includes a laterally extending aperture 152 through the floor 144 that is contiguous with the opening 148 into the dome 146.

The upper portion 138 of the bracket 134 includes a platform 154. The base structure 142 of the cushion unit 62 is slidably coupled with the platform 154 of the bracket 134, with the base structure 142 of the cushion unit 62 disposed above and opposing the platform 154 of the bracket 134. The platform 154 includes a floor 156 and a dome 158 that extends upward from the floor 156. The dome 158 is hollow with an opening 160 into the dome 158 at an inboard side 162 of the dome 158. The dome 158 of the platform 154 extends upward through the lateral extending aperture 152 through the floor 144 of the base structure 142 of the cushion unit 62. The inboard side 162 of the dome 158 of the platform 154 opposes the outboard side 150 of the dome 146 of the base structure 142 of the cushion unit 62.

The spring element 140 includes an inboard end 164 that contacts the cushion unit 62 by extending through the opening 148 of the dome 146 of the base structure 142 of the cushion unit 62. The spring element 140 further includes an outboard end 166 that contacts the upper portion 138 of the bracket 134 by extending through the opening 160 of the dome 158 of the platform 154 of the bracket 134. The dome 146 of the base structure 142 of the cushion unit 62, the dome 158 of the platform 154 of the bracket 134, and the floor 156 of the platform 154 of the bracket 134 cooperate to maintain the spring element 140 in position.

As the outboard force 88 upon the cushion unit 62 slides the cushion unit 62 to the outboard position 86, the spring element 140 energizes and biases the cushion unit 62 toward the inboard position 84. When the outboard force 88 expires, the inboard end 164 of the spring element 140 pushes against the dome 146 of the base structure 142 of the cushion unit 62 and pushes the cushion unit 62 inboard 50 to the inboard position 84. The cushion unit 62 transitions to the outboard position 86 when the outboard force 88 overcomes the bias toward the inboard position 84 provided by the spring element 140.

The inboard armrest assembly 46A further includes a second spring element 140f disposed between a second dome 146f of the base structure 142 and a second dome 158f of the platform 154 of the bracket 134. The second dome 146f of the base structure 142 of the cushion unit 62 is disposed forward 19 of, but otherwise identical to, the first dome 146 of the base structure 142 of the cushion unit 62. The second dome 158f of the platform 154 of the bracket 134 is disposed forward 19 of, but otherwise identical to, the first dome 158 of the platform 154 of the bracket 134. Like the first dome 158 of the platform 154 of the bracket 134, the second dome 158f of the platform 154 of the bracket 134 extends upward through a second laterally extending aperture 152f through the floor 144 of the base structure 142 of the cushion unit 62. The second laterally extending aperture 152f through the floor 144 is disposed forward 19 of the laterally extending aperture 152 through the floor 144 of the base structure 142. The second spring element 140f operates exactly as the first spring element 140 to bias the cushion unit 62 to the inboard position 84.

The platform 154 of the upper portion 138 of the bracket 134 further includes a plurality of guides 168 that extend upward from the floor 156. The illustrated embodiment includes a first guide 168r, a second guide 168i forward 19 of the first guide 168r, and a third guide 168f forward 19 of the second guide 168i. The first spring element 140 is disposed between the first guide 168r and the second guide 168i. The second spring element 140f is disposed between the second guide 168i and the third guide 168f. As each of the plurality of guides 168 are the same, only the first guide 168r will be further described in detail. The first guide 168r includes a forward lateral surface 170, rearward lateral surface 172, an inboard end 174, and an outboard end 176. The forward lateral surface 170 and the rearward lateral surface 172 can be at least approximately orthogonal to the floor 144. A distance 178 separates the inboard end 174 from the outboard end 176. The forward lateral surface 170 and the rearward lateral surface 172 can form at least approximately parallel planes.

The base structure 142 of the cushion unit 62 further includes a bottom 180. The bottom 180 of the base structure 142 faces the floor 156 of the platform 154 of the bracket 134. The floor 156 and the bottom 180 of the base structure 142 of the cushion unit 62 form generally parallel planes, so that, as the cushion unit 62 transitions from the inboard position 84 to the outboard position 86, the bottom 180 of the base structure 142 slides over the floor 156 of the platform 154. The base structure 142 further includes a plurality of recesses 182 into the bottom 180 that form raised portions 184 projecting upward from the floor 144. In the illustrated embodiment, the base structure 142 includes three recesses 182: a first recess 182r, a second recess 182i disposed forward 19 of the first recess 182r, and a third recess 182f disposed forward 19 of the second recess 182i. Each recess 182 of the plurality of recesses 182 receives one of the guides 168 of the plurality of guides 168 of the platform 154 of the upper portion 138 of the bracket 134. More specifically, the first recess 182r receives the first guide 168r, the second recess 182i receives the second guide 168i, and the third recess 182f receives the third guide 168f. As each of the plurality of recesses 182 are identical, only the first recess 182r will be further described in detail.

The first recess 182r (and thus each of the plurality of recesses 182) includes a forward lateral surface 186, a rearward lateral surface 188, an outboard end 190, and an inboard end 192. The forward lateral surface 186 of the first recess 182r is forward 19 of and opposes the forward lateral surface 170 of the first guide 168r that the first recess 182r has received. The rearward lateral surface 188 of the first recess 182r is disposed rearward 20 of the rearward lateral surface 172 of the first guide 168r that the first recess 182r has received. The inboard end 192 of the first recess 182r is disposed inboard 50 of the inboard end 174 of the first guide 168r that the first recess 182r has received. The outboard end 190 of the first recess 182r is disposed outboard 72 of the outboard end 176 of the first guide 168r that the first recess 182r has received. A distance 194 separates the inboard end 192 from the outboard end 190 of the first recess 182r. The distance 194 of the first recess 182r is greater than the distance 178 that separates the inboard end 174 of the first guide 168r from the outboard end 176 of the first guide 168r. Thus, the first recess 182r partially encases the first guide 168r that the first recess 182r has received. Because the distance 194 of the first recess 182r is greater than the distance 178 of the first guide 168r, the cushion unit 62 can slide outboard 72 in response to the outboard force 88 with the first recess 182r sliding over the first guide 168r of the bracket 134. The inboard end 174 of the first guide 168r that the first recess 182r has received contacts the inboard end 192 of the first recess 182r to limit the extent of movement outboard 72 to the outboard position 86 of the cushion unit 62. Similarly, the outboard end 176 of the first guide 168r that the first recess 182r has received contacts the outboard end 190 of the first recess 182r to limit the extent of movement inboard 50 to the inboard position 84 of the cushion unit 62. The second recess 182i and the third recess 182f of the base structure 142 of the cushion unit 62 receive and interact with the second guide 168i and the third guide 168f of the platform 154 of the bracket 134 attached to the frame 54 of the seat 38, respectively, in the same manner.

The first recess 182r and raised portion 184 formed therefrom of the base structure 142 of the cushion unit 62 share a top wall 196 and a laterally extending slot 198 through the top wall 196. The laterally extending slot 198 has a longitudinal width 200 and a lateral length 202. The longitudinal width 200 is generally forward-to-rearward relative to the vehicle 10. The lateral length 202 is generally inboard-to-outboard relative to the vehicle 10. The first guide 168r further includes a projection 204 that extends upward through the laterally extending slot 198 of the first recess 182r. The projection 204 terminates with an end 206 that has a longitudinal width 208 that is wider than the longitudinal width 200 of the laterally extending slot 198 of the first recess 182r. The end 206 faces a top surface 210 of the first recess 182r that is adjacent to the laterally extending slot 198. The end 206 of the projection 204 limits upward movement of the cushion unit 62 away from the platform 154 and maintains the cushion unit 62 slidably coupled to the platform 154 of the bracket 134.

Figure 24:
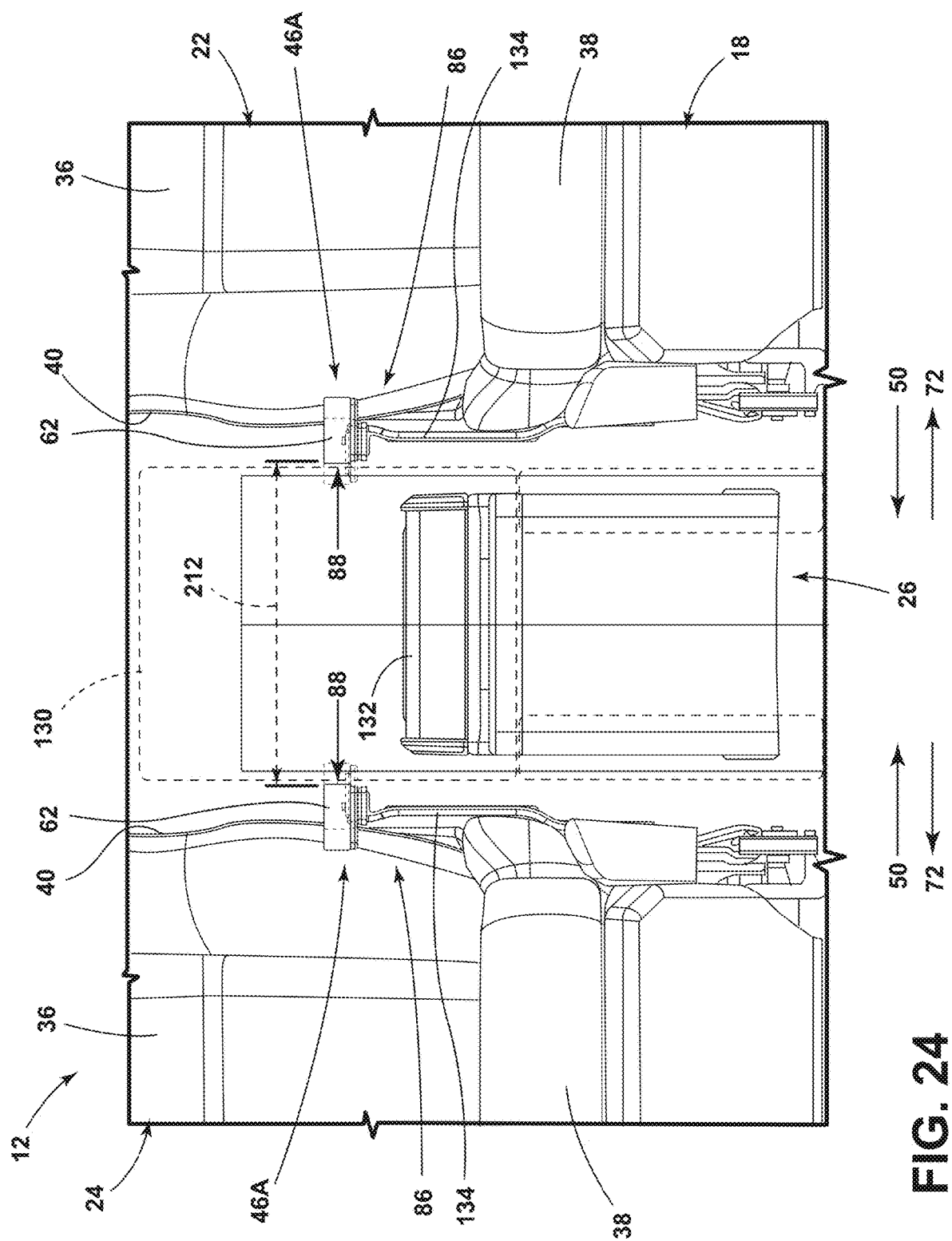
FIG. 24 is a view looking rearward within the interior of the vehicle toward the intermediate row of seating, illustrating the exertion of an outboard force upon the cushion units of the alternative embodiment inboard armrest assemblies of both the first seating assembly and the second seating assembly, thus sliding the cushion units to the outboard position over the platform of the bracket.

Referring now additionally to FIG. 24, in use, the passenger 130 moving through the aisle 26 between the first seating assembly 22 and the second seating assembly 24 of the intermediate row of seating 18 toward the rearward row of seating 16, such as to move the modular center console 132 to the rearward row of seating 16, can impose the outboard force 88 upon the cushion units 62 of the inboard armrest assemblies 46A to cause the cushion units 62 to slide to the outboard position 86 so that the cushion units 62 no longer project into the aisle 26 (or do so to a lesser extent). The cushion units 62 of the inboard armrest assemblies 46A thus do not impede movement rearward 20 through the aisle 26 within the interior 12 of the vehicle 10 to the rearward row of seating 16 from the intermediate row of seating 18. After the passenger 130 has moved rearward 20 past the intermediate row of seating 18, the passenger 130 stops imparting the outboard force 88, at which point the spring element 140 (and second spring element 140f) causes the cushion unit 62 to slide back to the inboard position 84.

When the cushion units 62 of the inboard armrest assemblies 46 of the first seating assembly 22 and the second seating assembly 24 are both in the outboard position 86, the cushion unit 62 of the inboard armrest assembly 46 of the first seating assembly 22 can be separated from the cushion unit 62 of the inboard armrest assembly 46 of the second seating assembly 24 by a distance 212 of greater than 220 mm, such as greater than 240 mm, such as approximately 250 mm or 250 mm. Similarly, when the cushion units 62 of the inboard armrest assemblies 46A of the first seating assembly 22 and the second seating assembly 24 are both in the outboard position 86, the cushion unit 62 of the inboard armrest assembly 46A of the first seating assembly 22 can be separated from the cushion unit 62 of the inboard armrest assembly 46A of the second seating assembly 24 by a distance 212 of greater than 220 mm, such as greater than 240 mm, such as approximately 250 mm or 250 mm.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly of a row of seating of a vehicle comprising:
    a seat including a frame having an inboard side; and
    an inboard armrest assembly comprising:
        a lower bracket attached to the inboard side of the frame of the seat;
        an upper bracket pivotally coupled to the lower bracket about a pivot axis extending generally forward-to-rearward; and
        a cushion unit mounted upon the upper bracket, the upper bracket having an inboard position and, upon application of an outboard force to the upper bracket, an outboard position further outboard than the inboard position, the upper bracket transitioning from the inboard position to the outboard position about the pivot axis;
    wherein, the lower bracket comprises an upper portion and an inboard facing surface at the upper portion;
    wherein, the upper bracket comprises a lower portion and an outboard facing surface at the lower portion, the outboard facing surface opposing the inboard facing surface of the lower bracket; and
    wherein, the inboard facing surface of the upper portion of the lower bracket limits inboard rotation movement of the upper bracket about the pivot axis.

2. The seating assembly of claim 1, wherein the outboard force moving the upper bracket and thus the cushion unit to the outboard position removes the inboard armrest assembly from projecting into a center aisle of a vehicle.

3. The seating assembly of claim 1, wherein in the outboard position, the upper bracket is rotated at least 5 degrees relative to the upper bracket while in the inboard position.

4. The seating assembly of claim 1, wherein in the outboard position, the upper bracket is rotated at least 10 degrees relative to the upper bracket while in the inboard position.

5. The seating assembly of claim 1, wherein the inboard armrest assembly further comprises a spring element biasing the upper bracket to the inboard position when the outboard force is not applied to the upper bracket.

6. The seating assembly of claim 1, wherein the lower bracket of the inboard armrest assembly comprises apertures through which fasteners extend to attach the lower bracket to the inboard side of the frame of the seat.

7. The seating assembly of claim 6, wherein the apertures of the lower bracket of the inboard armrest assembly are disposed outboard of the pivot axis.

8. The seating assembly of claim 1, wherein the inboard armrest assembly further comprises an axle defining the pivot axis.

9. The seating assembly of claim 8, wherein the lower bracket comprises a pair of tabs extending inboard and holding the axle, the axle extending between the pair of tabs.

10. The seating assembly of claim 8, wherein the upper bracket comprises a pair of tabs extending inboard, each including an aperture through which the axle extends.

11. The seating assembly of claim 10, wherein the lower bracket comprises a pair of tabs extending inboard and holding the axle, the axle extending between the pair of tabs, and the pair of tabs of the upper bracket are disposed between the pair of tabs of the lower bracket.

12. The seating assembly of claim 11, wherein the inboard armrest assembly further comprises a spring element biasing the upper bracket to the inboard position when the outboard force is not applied to the upper bracket;
the spring element includes a wound coil, a first end extending from the wound coil and contacting the upper bracket, and a second end extending from the wound coil and contacting the lower bracket; and
the axle extends through the wound coil.

13. The seating assembly of claim 12, wherein the upper bracket of the inboard armrest assembly further comprises a recess into which the first end of the spring element extends, the recess including an outboard facing surface that opposes the first end of the spring element and against which the first end of the spring element imposes an inboard biasing force; and
the lower bracket of the inboard armrest assembly further comprises a recess into which the second end of the spring element extends, the recess of the lower bracket including an outboard facing surface that opposes the second end of the spring element as the upper bracket transitions from the inboard position to the outboard position.

14. The seating assembly of claim 13, wherein
the first end of the spring element extends from the wound coil facing an inboard surface of the upper bracket before entering the recess of the upper bracket; and
the second end of the spring element extends from the wound coil opposing an inboard surface of the lower bracket before entering the recess of the lower bracket.

15. The seating assembly of claim 1, wherein
the outboard facing surface opposes the inboard facing surface of the lower bracket; and
both the inboard facing surface of the upper portion of the lower bracket and the outboard facing surface of the lower portion of the upper bracket are disposed outboard of the pivot axis, with a horizontal plane intersecting all of the pivot axis, the upper portion of the lower bracket, and the lower portion of the upper bracket.

16. The seating assembly of claim 15, wherein
the upper portion of the lower bracket includes a top; and
the top limits outboard rotational movement of the upper bracket about the pivot axis.

17. A seating assembly of a row of seating of a vehicle comprising:
a seat including a frame having an inboard side; and
an inboard armrest assembly comprising:
  a bracket including a lower portion attached to the inboard side of the frame of the seat and an upper portion disposed upward of the lower portion; and
  a cushion unit slidably coupled to the upper portion of the bracket, the cushion unit comprising an inboard position toward which the cushion unit is biased and an outboard position to which the cushion unit transitions upon application of an outboard force to the cushion unit that overcomes the bias toward the inboard position.

18. The seating assembly of claim 17, wherein
the inboard armrest assembly further comprises a spring with an inboard end contacting the cushion unit and an outboard end contacting the bracket;
the spring biases the cushion unit to the inboard position; and
application of the outboard force energizes the spring.

19. The seating assembly of claim 17, wherein
the upper portion of the bracket of the inboard armrest assembly comprises a platform with a floor and a plurality of guides that extend upwardly from the floor, each guide of the plurality of guides comprising a forward lateral surface, a rearward lateral surface, an inboard end, an outboard end, and a distance that separates the inboard end from the outboard end; and
the cushion unit further comprises a platform disposed above and opposing the platform of the upper portion of the bracket, the platform comprising a bottom and a plurality of recesses extending upward from the bottom;
each recess of the plurality of recesses receives one of the guides of the plurality of guides;
each recess of the plurality of recesses comprises (i) a forward lateral surface disposed forward of the forward lateral surface of the guide of the plurality of guides that the recess has received, (ii) a rearward lateral surface disposed rearward of the rearward lateral surface of the guide of the plurality of guides that the recess has received, (iii) an inboard end disposed inboard of the inboard end of the guide of the plurality of guides that the recess had received, and (iv) an outboard end disposed outboard of the outboard end of the guide of the plurality of guides that the recess has received;
a distance that separates the inboard end from the outboard end of the each recess of the plurality of recesses is greater than a distance that separates the inboard end from the outboard end of the guide of the plurality of guides that the recess has received;
the inboard end of the guide of the plurality of guides that the recess has received contacts the inboard end of the recess to limit the outboard position of the cushion unit; and
the outboard end of the guide of the plurality of guides that the recess has received contacts the outboard end of the recess to limit the inboard position of the cushion unit.

20. The seating assembly of claim 19, wherein
each recess of the plurality of recesses further comprises a top wall having a laterally extending slot with a longitudinal width; and
each guide of the plurality of guides further comprises a projection with a first portion extending upward through the laterally extending slot of the recess that has received the guide and a second portion with a longitudinal width that is wider than the longitudinal width of the laterally extending slot of the recess, the second portion being disposed above the laterally extending slot of the recess.

* * * * *